US006203934B1

(12) United States Patent
Naoe et al.

(10) Patent No.: US 6,203,934 B1
(45) Date of Patent: Mar. 20, 2001

(54) MAGNETIC RECORDING MEDIUM

(75) Inventors: Koji Naoe; Kiyomi Ejiri; Naoto Abe, all of Kanagawa (JP)

(73) Assignee: Fui Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/169,189

(22) Filed: Oct. 8, 1998

(30) Foreign Application Priority Data

Oct. 14, 1997 (JP) .................................................. 9-280629
Jan. 7, 1998 (JP) .................................................. 10-001760

(51) Int. Cl.[7] ........................................................ G11B 5/66
(52) U.S. Cl. .................................. 428/694.134; 427/128; 427/129; 427/130; 427/131; 428/694 B; 428/694 BS; 428/694 BN
(58) Field of Search .................................. 427/128, 129, 427/130, 131, 599, 548, 502; 428/694 B, 900, 694 BS, 694 BN, 694 BY

(56) References Cited

U.S. PATENT DOCUMENTS

| | | | |
|---|---|---|---|
| 4,163,823 | 8/1979 | Legras et al. | 428/317.9 |
| 4,439,795 | 3/1984 | Kitamoto et al. | 360/131 |
| 4,447,270 | 5/1984 | Howard et al. | 106/438 |
| 4,452,830 | 6/1984 | Yoshizumi | 427/215 |
| 4,506,000 | 3/1985 | Kubota et al. | 430/39 |
| 4,507,157 | 3/1985 | Oliver, Jr. | 117/56 |
| 4,528,240 | 7/1985 | Miyoshi et al. | 428/323 |
| 4,587,157 | 5/1986 | Brock et al. | 428/216 |
| 4,617,226 | 10/1986 | Yamaguchi et al. | 428/216 |
| 4,619,856 | 10/1986 | Kamada et al. | 428/143 |
| 4,649,073 | 3/1987 | Suzuki et al. | 428/212 |
| 4,654,260 | 3/1987 | Chubachi et al. | 428/328 |
| 4,664,975 | 5/1987 | Kobayshi et al. | 428/323 |
| 4,666,769 | 5/1987 | Miyata et al. | 428/323 |
| 4,708,906 | 11/1987 | Sekiyo et al. | 428/336 |
| 4,741,953 | 5/1988 | Katsuta et al. | 428/323 |
| 4,746,558 | 5/1988 | Shimozawa et al. | 428/141 |
| 4,756,953 | 7/1988 | Utsumi | 428/220 |
| 4,784,895 | 11/1988 | Mizuno et al. | 512/25 |
| 4,794,042 | 12/1988 | Kubota et al. | 428/328 |
| 4,839,225 | 6/1989 | Matsufuji et al. | 428/336 |
| 4,844,963 | 7/1989 | Takasuna et al. | 428/65.3 |
| 4,847,147 | 7/1989 | Aonuma et al. | 428/329 |
| 4,851,289 | 7/1989 | Ogawa et al. | 428/329 |
| 4,857,388 | 8/1989 | Ogawa et al. | 428/212 |
| 4,863,791 | 9/1989 | Steward et al. | 428/310.5 |
| 4,863,793 | 9/1989 | Ogawa et al. | 428/323 |
| 4,865,924 | 9/1989 | Saito et al. . | |
| 4,874,633 | 10/1989 | Komatsu et al. | 427/54 G |
| 4,910,068 | 3/1990 | Tokagi et al. | 428/141 |
| 4,916,024 | 4/1990 | Kasuga et al. | 428/323 |
| 4,943,479 | 7/1990 | Yamada et al. | 428/331 |
| 4,952,444 | 8/1990 | Kawamata et al. | 428/141 |
| 4,963,433 | 10/1990 | Ogawa et al. | 428/323 |

(List continued on next page.)

FOREIGN PATENT DOCUMENTS

| | | |
|---|---|---|
| 0 392 810 A2 | 10/1990 | (EP) . |
| 1417765 | 12/1975 | (GB) . |
| 1417442 | 12/1975 | (GB) . |
| 63-113931 | 5/1963 | (JP) . |
| 54-30002 | 3/1979 | (JP) . |
| 55-55438 | 4/1980 | (JP) . |
| 55-139634 | 10/1980 | (JP) . |
| 57-6178 | 2/1982 | (JP) . |
| 58-85931 | 5/1983 | (JP) . |
| 58-139337 | 8/1983 | (JP) . |
| 58-159228 | 9/1983 | (JP) . |
| 58-51327 | 11/1983 | (JP) . |
| 59-8124 | 1/1984 | (JP) . |
| 59-154646 | 9/1984 | (JP) . |
| 60-109020 | 6/1985 | (JP) . |
| 60-154327 | 8/1985 | (JP) . |
| 60-164926 | 8/1985 | (JP) . |
| 60-193130 | 10/1985 | (JP) . |
| 61-172215 | 8/1986 | (JP) . |
| 61-216116 | 9/1986 | (JP) . |
| 61-204827 | 9/1986 | (JP) . |
| 61-204829 | 9/1986 | (JP) . |
| 61-214127 | 9/1986 | (JP) . |
| 61-237623 | 10/1986 | (JP) . |
| 61-241325 | 10/1986 | (JP) . |
| 62-22235 | 1/1987 | (JP) . |
| 62-001115A | 1/1987 | (JP) . |
| 62-36727 | 2/1987 | (JP) . |
| 62-33337 | 2/1987 | (JP) . |
| 62-159338 | 7/1987 | (JP) . |
| 62-188017 | 8/1987 | (JP) . |
| 62-222427 | 9/1987 | (JP) . |
| 62-219321 | 9/1987 | (JP) . |
| 62-234231 | 10/1987 | (JP) . |
| 63-146210 | 6/1988 | (JP) . |

(List continued on next page.)

OTHER PUBLICATIONS

U.S. application No. 08/976,822, filed Nov. 24, 1997, Satoshi Matsubaguchi, abandoned; filed as CIP 09/324,754.

The Advantages of the Thin Magnetic Layer on a Metal Particulate Tape, IEEE Transactions on Magnetics, vol. 29, No. 6, Nov. 1993.

Development of Particulate Recording Media with Ultrathin Magnetic Layer, IEICE Trans Electron, vol. E78–C. No. 11, Nov. 1995.

Enabling technologies for a 100MB 3.5 floppy (ZIP™) disk drive, 220/SPIE vol. 2604 (No Date Available).

*Primary Examiner*—Bernard Pianalto
(74) *Attorney, Agent, or Firm*—Stroock & Stroock & Lavan LLP

(57) ABSTRACT

A magnetic recording medium is described, which comprises a support having thereon a magnetic layer comprising a ferromagnetic metal powder and a binder resin, wherein the coercive force (Hc) of the magnetic layer is from 2,100 to 3,000 Oe, SFD (switching field distribution) of the magnetic layer is 0.30 or less, and an average thickness: d of the magnetic layer is in the range of: $d \leq$ recording wavelength $\lambda/4$.

35 Claims, No Drawings

U.S. PATENT DOCUMENTS

| | | | |
|---|---|---|---|
| 4,965,120 | 10/1990 | Ono et al. ............................. | 428/213 |
| 5,030,484 | 7/1991 | Chino et al. ...................... | 427/434.3 |
| 5,032,428 | 7/1991 | Ogawa et al. ........................ | 427/130 |
| 5,051,291 | 9/1991 | Kowahaue et al. .................. | 428/141 |
| 5,051,303 | 9/1991 | Naguchi et al. ..................... | 428/329 |
| 5,093,192 | 3/1992 | Kawahara et al. ................... | 428/323 |
| 5,104,750 | 4/1992 | Kubo et al. .................... | 428/694 MT |
| 5,112,679 | 5/1992 | Nakagawa et al. .................. | 428/323 |
| 5,151,323 | 9/1992 | Kowahaue et al. .................. | 428/323 |
| 5,156,908 | 10/1992 | Araki et al. ........................... | 428/323 |
| 5,160,761 | 11/1992 | Koga et al. ........................... | 427/548 |
| 5,196,265 | 3/1993 | Pyoke et al. .......................... | 428/332 |
| 5,219,670 | 6/1993 | Ohno et al. ....................... | 428/694 B |
| 5,258,223 | 11/1993 | Inaba et al. ........................... | 428/323 |
| 5,266,376 | 11/1993 | Okazaki et al. ...................... | 428/141 |
| 5,268,206 | 12/1993 | Komatsu et al. ....................... | 427/58 |
| 5,300,314 | 4/1994 | Hayakawa et al. .................... | 427/58 |
| 5,318,838 | 6/1994 | Matsufuji et al. .................... | 428/328 |
| 5,358,777 | 10/1994 | Kojima et al. ........................ | 428/212 |
| 5,384,175 | 1/1995 | Kojima et al. ........................ | 428/65.3 |
| 5,455,104 | 10/1995 | Sekiguchi et al. ................... | 428/214 |
| 5,455,112 | 10/1995 | Inaba et al. ........................... | 428/323 |
| 5,458,948 | 10/1995 | Yanagita et al. ..................... | 428/414 |
| 5,489,466 | 2/1996 | Inaba et al. ........................... | 428/212 |
| 5,496,607 | 3/1996 | Inaba et al. ........................... | 428/65.3 |
| 5,503,911 | 4/1996 | Aoki et al. ............................ | 428/213 |
| 5,514,464 | 5/1996 | Sasaki et al. ......................... | 428/323 |
| 5,518,804 | 5/1996 | Mizuno et al. ....................... | 428/212 |
| 5,532,041 | 7/1996 | Honjo et al. .......................... | 428/141 |
| 5,547,772 | 8/1996 | Saito et al. ....................... | 428/694 B |
| 5,597,638 | 1/1997 | Saito et al. ........................... | 428/141 |
| 5,645,917 | 7/1997 | Ejiri et al. . | |
| 5,672,423 | 9/1997 | Inaba et al. ........................... | 428/323 |
| 5,718,964 * | 2/1998 | Naoe et al. . | |
| 5,756,148 | 5/1998 | Ejiri et al. . | |
| 5,763,046 | 6/1998 | Ejiri et al. . | |
| 5,776,590 * | 7/1998 | Yamazaki et al. . | |
| 5,780,141 | 7/1998 | Ejiri et al. ............................ | 428/623 |
| 5,792,543 | 8/1998 | Ejiri et al. . | |
| 5,795,646 | 8/1998 | Ejiri et al. . | |
| 5,811,166 | 9/1998 | Ejiri et al. . | |
| 5,811,172 | 9/1998 | Ejiri et al. . | |
| 5,827,600 | 10/1998 | Ejiri et al. . | |
| 5,851,622 | 12/1998 | Ejiri et al. . | |
| 5,876,833 * | 3/1999 | Suzuki et al. . | |
| 5,922,454 * | 7/1999 | Inaba et al. . | |
| 5,993,948 * | 11/1999 | Yamazaki et al. . | |

FOREIGN PATENT DOCUMENTS

| | | |
|---|---|---|
| 63-157313 | 6/1988 | (JP) . |
| 63-164022 | 7/1988 | (JP) . |
| 63-317926 | 12/1988 | (JP) . |
| 1-109518 | 4/1989 | (JP) . |
| 1-119916 | 5/1989 | (JP) . |
| 1-276422 | 7/1989 | (JP) . |
| 1-220120 | 9/1989 | (JP) . |
| 1-235211 | 9/1989 | (JP) . |
| 1-248318 | 10/1989 | (JP) . |
| 1-300419 | 12/1989 | (JP) . |
| 2-15415 | 1/1990 | (JP) . |
| 2-98816 | 1/1990 | (JP) . |
| 2-58727 | 2/1990 | (JP) . |
| 2-149916 | 6/1990 | (JP) . |
| 1-2-208824 | 8/1990 | (JP) . |
| 2-257424 | 10/1990 | (JP) . |
| 2-307806 | 12/1990 | (JP) . |
| 3-17817 | 1/1991 | (JP) . |
| 3-5913 | 1/1991 | (JP) . |
| 3-49032 | 3/1991 | (JP) . |
| 3-80422 | 4/1991 | (JP) . |
| 3-88118 | 4/1991 | (JP) . |
| 3-157812 | 7/1991 | (JP) . |
| 3-219424 | 9/1991 | (JP) . |
| 4-271010 | 9/1992 | (JP) . |

* cited by examiner

MAGNETIC RECORDING MEDIUM

FIELD OF THE INVENTION

The present invention relates to a magnetic recording medium, in particular, the present invention relates to a magnetic recording particulate medium suitable for high density (high capacity) recording and reproducing of digital signals.

BACKGROUND OF THE INVENTION

Magnetic recording media are widely used as audio tapes, video tapes, computer tapes, computer discs and the like. A magnetic recording medium has become generally higher in density. The recording wavelength has become shorter and recording systems from an analog system to a digital system have been discussed.

Regarding the demand for higher density recording, a magnetic recording particulate medium formed by coating a dispersion of a ferromagnetic powder in a binder on a support has been inferior to a magnetic recording metal-film medium (metal-evaporated) in electromagnetic characteristics due to low packing density of a ferromagnetic powder. However, with the improvement of the performance of ferromagnetic powders and the advancement of the coating technique of an extremely thin layer in recent years, almost the same level of electromagnetic characteristics with those of the metal-film medium have been achieved. Further, a magnetic recording paticulate medium is superior in productivity and corrosion resistance.

As magnetic recording particulate media, those comprising a support having coated thereon a magnetic layer comprising a ferromagnetic powder, e.g., ferromagnetic iron oxide, Co-modified ferromagnetic iron oxide, $CrO_2$, ferromagnetic metal (including alloys), etc., dispersed in a binder have been generally used.

For improving electromagnetic characteristics of a magnetic recording particulate medium, various methods such as means of improving magnetic characteristics of ferromagnetic powders or surface smoothness of magnetic layer have been suggested but these are not sufficiently satisfactory in view of higher density recording. Further, recording wavelength shows a tendency to become shorter with the progress of high density recording of a magnetic recording medium in recent years. The self demagnetization loss at recording time, i.e., output decreases due to increase of magnetic layer thickness, and the thickness loss at the time of reproduction have become serious problems. Therefore, a magnetic recording particulate medium comprising an extremely thin layer is proposed.

Further, as a video tape used for a magnetic tape cassette of Hi-8 or digital VCR for consumer use (SD specification) which is hereinafter referred to as DVC, a tape of magnetic recording metal-film medium in which a magnetic recording layer comprises a vaccum deposited metal (alloy), i.e., an ME (metal-evaporated) tape, has been nowadays put to practical use, and a system of using a magnetic recording particulate tape using a ferromagnetic metal powder, i.e., an MP (metal particulate) tape, and an ME tape concurrently has been realized.

For the coexistence with an ME tape, an MP tape must have higher output by thinning the magnetic layer, same as an ME tape, and also it is necessary that the relationship between the recording current and the reproduction output of an MP tape should be the same with that of an ME tape. If the recording current of an MP is increased gradually, the reproduction output thereof decreases due to recording demagnetization, but an ME tape does not have such a tendency and if the recording current is increased, the reproduction output tends to be saturated. Therefore, an Hi-8 deck takes the dual system of recording respectively with different recording currents for MP and ME tapes in practice, which complicates the circuit. For resolving this problem, it is necessary for the system to be capable of common use of an MP tape and an ME tape and recording is performed with the same recording current. However, there is a problem such that when an MP tape is recorded/reproduced with the optimal recording current of an ME tape, the output is lowered. On the other hand, when an ME tape is recorded/reproduced with the optimal recording current of an MP tape, an ME tape cannot exhibit its capability and the output is lowered. Accordingly, it has been necessary to make the optimal recording current of an MP tape almost equal to that of an ME tape.

Further, a signal of recording wavelength of 22 $\mu$m has been adopted as a synchronizing signal and a signal of recording wavelength of 0.488 $\mu$m has been adopted as a data signal in a digital video cassette recorder for consumer use. An overwriting erasure omitting an erasure head has been employed for the sake of making a recorder light-weight. For adopting overwriting erasure, a synchronizing signal is necessary to be erased by a data signal and the overwriting erasure factor is said to be preferably −20 dB or less. It is desired that an overwriting erasure factor be as low as possible as an essential characteristic for a magnetic recording medium.

For reducing an overwriting erasure factor, it has been thought that lowering the coercive force Hc of a magnetic layer would be sufficient. However, by the reduction of the coercive force Hc, an overwriting erasure factor can be improved but there is a limit because high frequency output is reduced due to recording demagnetization. Further, it has been suggested that the thickness of a magnetic layer be decreased for reducing an overwriting erasure factor. However, too thin a layer causes deficiency of magnetization amount. As a result output is entirely decreased whether it is short wave or long wave. Therefore, this can be limiting.

As a means for ensuring magnetization amount when a magnetic layer is extremely thin, there is a method of using a ferromagnetic powder having high saturation magnetization $\sigma_s$ and a method of decreasing the amount of a binder resin or the amount of nonmagnetic powders, such as an abrasive, etc. However, the dispersibility of a magnetic (coating) solution is reduced, the surface properties of a magnetic layer are degraded, or the strength of a magnetic layer becomes insufficient. As a result, running durability is extremely reduced.

SUMMARY OF THE INVENTION

An object of the present invention is to provide a magnetic recording particulate medium excellent in electromagnetic characteristics, in particular, to provide a magnetic recording medium as a tape for DVC used for digital recording which is well balanced in input/output characteristics and overwriting characteristics to have interchangeability with an ME tape, has high output and is excellent in overwriting characteristics.

The above object of the present invention has been achieved by a magnetic recording medium which (is a magnetic recording particulate medium and) comprises a support having thereon a magnetic layer comprising a ferromagnetic metal powder dispersed in a binder resin, wherein coercive force (Hc) of the magnetic layer is from 2,100 to 3,000 Oe, SFD (switching field distribution) of the magnetic layer is 0.30 or less, and an average thickness d: of the magnetic layer is in the range of: $d \leq$ recording wavelength $\lambda/4$.

Preferred embodiments of the present invention are as follows.

(1) In the magnetic recording medium, residual magnetic flux density (Br) of the magnetic layer is 5,000 G or more.

(2) In the magnetic recording medium, between the support and the magnetic layer, a nonmagnetic layer comprising a nonmagnetic inorganic powder and a binder resin is provided, and the magnetic layer and the nonmagnetic layer are formed by simultaneous multilayer coating.

(3) In the magnetic recording medium, an average magnetic layer thickness d is 0.12 μm or less and the standard deviation σ of the magnetic layer thickness is 0.05 μm or less.

The present invention is characterized in that respective electromagnetic characteristics of 1/2 Tb output, 1/90 Tb output and overwriting characteristics (O/W) in the magnetic recording medium are satisfied by specifying three characteristics of the magnetic layer, i.e., coercive force (Hc), SFD (switching field distribution) and the average thickness (d). However, means to obtain the magnetic layer satisfying the above three characteristics are not particularly restricted to specific means.

DETAILED DESCRIPTION OF THE INVENTION

The layer constitution of the magnetic recording medium according to the present invention is not particularly limited provided that the magnetic recording medium comprises a support having thereon at least one magnetic layer having the above-described characteristics. For example, two or more layers respectively containing different compositions of ferromagnetic metal powders may be laminated as magnetic layers. In this case, it is necessary that the average magnetic layer thickness: d, i.e., the sum total of each layer, should be $\lambda/4$ or less. Since $\lambda$ means optional recording wavelength, the minimum value of d is necessarily 1/4 or less of the shortest recording wavelength. The magnetic recording medium of the present invention is suitable for DVC, and the shortest recording wavelength of DVC is 0.488 μm, therefore, d is 0.12 μm or less. d is more preferably from 0.02 to 0.1 μm, and particularly preferably from 0.05 to 0.1 μm. Further, in this case, the standard deviation: σ of the magnetic layer thickness is preferably 0.05 μm or less, more preferably from 0.001 to 0.03 μm.

In the preferred embodiment of the present invention, as described in the above item (2), the magnetic recording medium has, between the support and the magnetic layer, a nonmagnetic layer mainly comprising a nonmagnetic inorganic powder and a binder resin. In this case, it is preferred that the magnetic layer and the nonmagnetic layer are formed by simultaneous multilayer coating. In the case of a multilayer constitution, the magnetic layer is called an upper layer and the nonmagnetic layer is called a lower layer.

In the present invention, the residual magnetic flux density (Br) of the magnetic layer is preferably 5,000 G (Gauss) or more, more preferably from 5,000 to 8,000 G. By setting up Br within this range, reduction of 1/90 Tb output can be prevented.

As a means to set up Br within this range, increasing the packing density of ferromagnetic metal powders contained in the magnetic layer is exemplified, for example, the following means can be cited:

a) Binder resins excellent in dispersibility are used and, at the same time, the amount thereof is devised to be reduced.

b) Surface properties of ferromagnetic metal powders are improved to improve the dispersibility.

c) Migration of binder resins (in particular, low molecular weight components) from the lower layer to the upper layer is inhibited.

For favorably satisfying the above-described ranges of Hc, SFD and d of the magnetic layer according to the present invention to form the MP tape having electromagnetic characteristics equal to those of the ME tape, it is preferred to use ferromagnetic metal powders, which are contained in the magnetic layer, having Hc of from 2,200 to 3,000 Oe, a saturation magnetization ($\sigma_s$) of from 140 to 170 emu/g, a crystallite size of from 100 to 170 Å, and SFD of 1.0 or less, more preferably Hc of from 2,250 to 2,800 Oe, $\sigma_s$ of from 150 to 170 emu/g, a crystallite size of from 120 to 160 Å, and SFD of 0.95 or less, (most preferably 0.85 or less).

As the Hc value of the magnetic recording medium of the present invention is set up at high value, 1/2 Tb output (output at a high region) can be ensured and also, when d is thinner, e.g., 0.12 μm or less, Br can be heightened and at the same time low SFD can be ensured, therefore, reduction of 1/90 Tb output (tracking signal output) can be inhibited and also good O/W can be secured.

Specific methods of the above items a), b) and c) are described below.

In the first place, item a) is described.

As the binder resin to be contained in the magnetic layer of the present invention, polyurethane resin is preferably used in an amount of from 50 to 100 wt %, more preferably from 70 to 100 wt %, based on the total weight of the binder resin, and the total weight of the binder resin based on the weight of the ferromagnetic metal powders contained in the magnetic layer is preferably from 5 to 18 wt %, more preferably from 5 to 12 wt %.

As the above polyurethane resin, polyurethane resins which are reaction products comprising diol and organic diisocyanate as main starting materials are used. As diol components, it is preferred to include short chain diol units having a cyclic structure and long chain diol units containing an ether group. It is preferred that such polyurethane resins include short chain diol units having a cyclic structure in an amount of from 17 to 40 wt % based on the polyurethane resin and long chain diol units containing from 1.0 to 5.0 mmol/g of an ether group based on the total polyurethane resin in an amount of from 10 to 50 wt % based on the polyurethane resin.

Short chain diols having a cyclic structure means diols having a saturated or unsaturated cyclic structure and molecular weight of less than 500, e.g., diols having an aromatic or alicyclic structure such as bisphenol A, the hydrogenated bisphenol A represented by the following formula (1), bisphenol S, bisphenol P, ethylene oxide and propylene oxide adducts of these bisphenols, cyclohexanedimethanol, cyclohexanediol, etc.

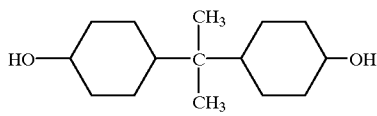
(1)

More preferred of them are the hydrogenated bisphenol A represented by formula (1) and ethylene oxide and propylene oxide adducts thereof.

The short chain diol having a cyclic structure is selected from those having a molecular weight of from 50 to less than 500.

The short chain diol having the above-described cyclic structure may be used in combination with other diols having a molecular weight of less than 500. Specific examples thereof include straight chain or branched diols, such as ethylene glycol, 1,3-propylenediol, 1,2-propylene glycol, 1,4-butanediol, 1,5-pentanediol, 1,6-hexanediol, 2,2-dimethylpropanediol, 1,8-octanediol, 1,9-nonanediol, diethylene glycol, and ethylene oxide or propylene oxide adducts of N-diethanolamine.

A coated film having high strength, high Tg and high durability can be obtained by virtue of the cyclic structure using these compounds. Further, excellent solubility in a solvent can be obtained by the introduction of branched $CH_3$, to thereby obtain high dispersibility.

The content of the short chain diol units in the polyurethane resin is preferably from 17 to 40 wt % and more preferably from 20 to 30 wt %.

Long chain diols are diols having a molecular weight of 500 or more, and preferred specific examples thereof include ethylene oxide and/or propylene oxide adducts of bisphenol A, hydrogenated bisphenol A, bisphenol S and bisphenol P, polypropylene glycol, polyethylene glycol, and polytetramethylene glycol. The compound represented by the following formula (2) are particularly preferred.

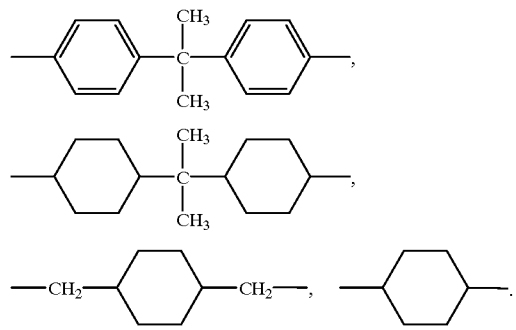
(2)

R is at least one of the following:

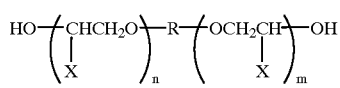

In formula (2), n and m each is a number of 3 to 24.

In the long chain diol represented by formula (2), R is preferably represented by the following formula (i) or (ii).

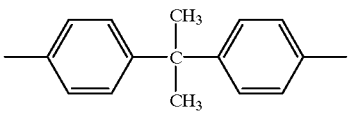
(i)

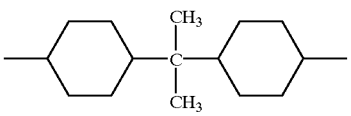
(ii)

R is more preferably represented by formula (i).

In the long chain diol represented by formula (2), X preferably represents a hydrogen atom or a methyl group, more preferably a methyl group. Here, all of X which are parenthesized by n or m are not always the same. For example, when n or m is 2, two X's may be hydrogen atoms or methyl groups, or one of two X's may be a hydrogen atom and the other may be a methyl group.

As the polyurethane resins particularly preferably used in the present invention have a cyclic structure, they can ensure high film strength and excellent durability, and further, they can have excellent solubility into a solvent and high dispersibility since they have the $CH_3$ branches of propylene introduced.

The weight average molecular weight (Mw) of the long chain diol is from 500 to 5,000, preferably from 700 to 3,000.

The content of the long chain diol units containing an ether group is preferably from 10 to 50 wt %, more preferably from 30 to 40 wt %, based on the polyurethane resin. The content of the ether group contained in the long chain diol units is preferably from 1.0 to 5.0 mmol, more preferably from 2.0 to 4.0 mmol, per gram of the polyurethane resin.

The number average molecular weight (Mn) of the polyurethane resin is preferably from 18,000 to 56,000, more preferably from 23,000 to 34,000, and the weight average molecular weight (Mw) is preferably from 30,000 to 100,000, more preferably from 40,000 to 60,000.

The glass transition temperature Tg of the polyurethane resin is from 0 to 200° C., preferably from 30 to 150° C., and more preferably from 30 to 130° C.

Vinyl chloride-based synthetic resins may be used in combination with the above polyurethane resins. Vinyl chloride-based resins which can be used in combination preferably have a polymerization degree of from 200 to 600, particularly preferably from 250 to 450. Vinyl chloride-based resins copolymerized with vinyl monomers, e.g., vinyl acetate, vinyl alcohol, vinylidene chloride, acrylonitrile, etc., may be used. Further, polyurethane resins may also be used in combination with cellulose derivatives such as nitrocellulose, an acrylic resin, a polyvinyl acetal resin, a polyvinyl butyral resin, an epoxy resin, a phenoxy resin, etc. These resins may be used alone or in combination.

In addition, it is also preferred to add the above polyurethane resins in the nonmagnetic layer.

Item b) is described below.

An aromatic organic acid compound can be used in the magnetic layer to improve surface properties of ferromagnetic metal powders, and the content thereof is preferably from 0.1 to 0.8 mol, more preferably from 0.2 to 0.5 mol, per kg of the ferromagnetic metal powder.

Aromatic organic acid compounds for use in the present invention are the compounds which are strongly adsorbed onto various powders including at least a ferromagnetic metal powder and those having high affinity with a polyurethane resin are preferred. Accordingly, preferably strong acids having a large acid dissociation constant, e.g., organic acids or salts of them having a pKa value of 3 or less are suitable as such aromatic organic acid compounds.

Here, aromatic organic acid compounds include, in addition to free acids, salts or derivatives thereof, e.g., esters, etc. The concept of the above-described adsorption onto powders includes chemical adsorption including covalent bond, as well as physical adsorption.

Examples of organic acids having a pKa value of 3 or less include α-naphthylphosphoric acid, phenylphosphoric acid, diphenylphosphoric acid, p-ethylbenzenephosphonic acid, phenylphosphonic acid, phenylphosphinic acid, methanesulfonic acid, benzenesulfonic acid, p-toluenesulfonic acid, naphthalene-α-sulfonic acid, naphthalene-β-sulfonic acid, etc., or salts of these acids.

Aromatic organic acid compounds can be used in any method as far as the above-described properties can be exhibited, preferably they are added at the same time with ferromagnetic metal powders and binders when they are kneaded at preparation of coating solution, or ferromagnetic metal powders are previously surface treated with aromatic organic acid compounds prior to kneading ferromagnetic metal powders with binders.

These aromatic organic acid compounds are preferably added also to the lower layer, and the amount is in general from 0.1 to 0.5 mol, preferably from 0.1 to 0.35 mol, per kg of the nonmagnetic powder.

Item c) is described below.

Reduction of low molecular weight components can be devised by reducing the amount of binder resins in the lower layer, thereby migration of the binder resins from the lower layer to the upper magnetic layer at simultaneous multilayer coating can be prevented. For that purpose, the amount of the binder resin in the lower layer (including the curing agent) is preferably from 14 to 25 weight parts, more preferably from 14 to 20 weight parts, per 100 weight parts of the total amount of the nonmagnetic inorganic powder.

Low molecular weight components include, besides the low molecular weight components contained in polyurethane resins and vinyl chloride resins used as the binder, unreacted products of polyisocyanate compounds used for curing the binder. Further, as nonmagnetic inorganic powders, nonmagnetic inorganic powders, carbon blacks, abrasives, etc., can be exemplified.

Moreover, when low molecular weight vinyl chloride based resins, preferably having the average molecular weight by gel permeation chromatography (GPC) of from about 5,000 to about 15,000, are used as a binder resin in the lower layer, and only the above-described polyurethane resins comprising short chain diols and long chain diols are used as a binder resin in the upper magnetic layer or, alternatively, when binder resins comprising the above polyurethane resins as a main component are used and the lower layer and the upper layer are multilayer-coated simultaneously, a small amount of vinyl chloride based resins can be precipitated in the vicinity of the magnetic layer surface. By virtue of this method, the glass transition temperature (Tg) of the magnetic layer surface can be appropriately reduced and calendering workability can be further improved. In this case, it is preferred that polyurethane resins comprising short chain diols and long chain diols are also used in the lower layer, and the amount thereof is from 10 to 80 wt %, preferably from 15 to 60 wt %, based on the entire binder resin in the lower layer (including the curing agent).

However, as the molecular weight components having the average molecular weight of less than 5,000 measured by GPC largely contributes to the migration of the binder resins from the lower layer to the upper magnetic layer, when vinyl chloride based resins are used in the magnetic layer, it is further effective to inhibit the migration by reducing the amount of vinyl chloride based resins used in the lower layer. From this point of view, the content of the above polyurethane resins in the lower layer is preferably from 20 to 100 wt %, more preferably from 20 to 80 wt %, based on the total weight of the binder resins in the lower layer.

Further, by reducing the amount of the binder resins in the lower layer as in the above item c), the hardness of the lower layer can be lowered as compared to the magnetic layer. Accordingly, as it is possible for the magnetic layer according to the present invention easily to receive influence of the hardness of the lower layer by thinning the average thickness d of the magnetic layer, the head touch can be improved.

Further, when binder resins mainly comprising the above-described polyurethane resins comprising short chain diols and long chain diols are used in the magnetic layer, toughness of the magnetic layer is ensured and, further, when binder resin compositions which impart plasticity, e.g., compounds obtained by curing the above polyurethane resins and, if necessary, vinyl chloride (based) resins having a polar group (e.g., a sulfo group and a potassium salt group thereof) with polyisocyanate compounds are used in the nonmagnetic layer, the lower nonmagnetic layer are easily sunken by the stress due to contact between the upper magnetic layer and the head, and then the head sinks in the upper magnetic layer. As a result, contact points of the head, etc., increase upon contacting, stress concentration of the magnetic layer is loosened, and running durability such as still life can be improved.

In the present invention, the standard deviation σ of the magnetic layer thickness is preferably 0.05 μm or less. Well-known means can be used for achieving the above range of the standard deviation, in addition to the above-described means. For example, the magnetic layer is preferably simultaneously multilayer-coated on the lower layer, and various methods can be used in that case, such as a method comprising making the viscoelasticities of both coating solutions approximate (e.g., adjusting the thixotropy by selecting the kind and size of the powder of, in particular, the lower layer coating solution), a method comprising controlling the sizes of the powders contained in both layers so that there are no mixed areas in the interface of the lower layer and the upper layer (e.g., using, as the nonmagnetic inorganic powder in the lower layer, those having the average particle size of from one half to four times of the crystallite size of the acicular ferromagnetic metal powder, or those having the average particle size of one-third or less of the long axis length of the acicular ferromagnetic metal powder), and methods disclosed in U.S. Pat. No. 5,496,607.

In the case of multilayer constitution, the average thickness d of the magnetic layer and the standard deviation σ of the magnetic layer thickness means the values measured according to the following methods. When the magnetic layer is a single layer, the values are also obtained correspondingly.

The sample having a thickness of about 0.1 μm is cut out with a diamond cutter in the machine direction of the magnetic recording medium, observed with a transmission type electron microscope of from 10,000 to 100,000, preferably from 20,000 to 50,000 magnifications and is photographed. The print size of the photograph is from A4 (i.e., 297×210 mm) to A5 (i.e., 210×148 mm) sizes. Then, the interface and the surface of the magnetic layer are rimmed with black by visual judgement paying attentions to the difference of the shapes of the ferromagnetic metal powders and the nonmagnetic inorganic powders of the magnetic layer and the nonmagnetic layer. Thereafter, the distance of the rimmed lines is measured by the image processing apparatus "IBAS2" (manufactured by Zeiss Corp.). Measurement is conducted from 85 to 300 times when the length of the sample photograph is 21 cm. The average measured value at that time is taken as d and the standard deviation σ is obtained from the following equation.

$$\sigma=\{[(d_1-d)^2+(d_2-d)^2+\ldots+(d_n-d)^2]/(n-1)\}^{1/2}$$

wherein $d_1, d_2 \ldots d_n$ represent respective measured values, and n represents from 85 to 300.

The maximum value of each measured value of the magnetic layer thickness is preferably within the range of from about 1.0 to about 3 times of d and the minimum value of each measured value of the magnetic layer thickness is preferably within the range of from about 0.4 to about 1 time of d.

The magnetic recording medium according to the present invention is further described in detail below.

The ferromagnetic metal powders which can be used in the present invention are not particularly limited but Fe or alloys containing Fe as a main component are preferably used.

These ferromagnetic metal powders which can be preferably used in the magnetic layer of the present invention may contain, in addition to the prescribed atoms, the following atoms, e.g., Al, Mg, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B. In particular, it is preferred to contain at least one selected from the group consisting of Al, Mg, Si, Ca, Y, Ba, La, Nd, Co, Ni and B, in addition to Fe.

These ferromagnetic metal powders may be previously treated with the later described dispersant, lubricant, surfactant, and antistatic agent before dispersion. Specific examples thereof are disclosed in JP-B-44-14090 (the term "JP-B" as used herein means an "examined Japanese patent publication"), JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, U.S. Pat. Nos. 3,026,215, 3,031,341, 3,100,194, 3,242,005, and 3,389,014.

Ferromagnetic metal powders may contain a small amount of a hydroxide or an oxide. Ferromagnetic metal powders can be prepared by well-known processes, such as a method comprising reducing a composite organic acid salt (mainly an oxalate) with a reducing gas, e.g., hydrogen; a method comprising reducing iron oxide with a reducing gas, e.g., hydrogen, to obtain Fe or Fe—Co particles; a method comprising pyrolysis of a metal carbonyl compound; a method comprising adding to an aqueous solution of a ferromagnetic metal a reducing agent, e.g., sodium borohydride, hypophosphite, or hydrazine, to conduct reduction; and a method comprising evaporating a metal in a low pressure inert gas to obtain a fine powder. The thus-obtained ferromagnetic metal powders which are subjected to well-known gradual oxidization treatment can be used in the present invention, e.g., a method comprising immersing powders in an organic solvent, then drying; a method comprising immersing powders in an organic solvent, then charging an oxygen-containing gas to form oxide films on the surfaces thereof and drying; and a method comprising forming oxide films on the surfaces of the powders by regulating partial pressure of an oxygen gas and an inert gas without using an organic solvent.

Ferromagnetic metal powders which can be preferably used in the magnetic layer according to the present invention have a specific surface area ($S_{BET}$) as measured by the BET method of from 30 to 50 m$^2$/g, thereby good surface property and low noise become compatible.

The average long axis length of ferromagnetic metal powders is preferably from 0.05 to 0.15 μm, and more preferably from 0.08 to 0.12 μm.

The long axis length of ferromagnetic metal powders can be obtained by arbitrarily combining the following methods, i.e., a method comprising taking transmission type electron microscopic photographs of ferromagnetic metal powders and directly reading the short axis length and the long axis length of ferromagnetic metal powders from the photographs and a method comprising reading the short axis length and the long axis length by tracing the transmission type electron microscopic photographs by the image analyzing apparatus "IBASSI" (manufactured by Carl Zeiss Corp.).

Ferromagnetic powders preferably have an acicular ratio of from 4 to 18, more preferably from 5 to 12. Ferromagnetic metal powders preferably have a water content of from 0.01 to 2%. The water content of ferromagnetic metal powders is preferably optimized by selecting the kinds of binders.

The pH of ferromagnetic metal powders is preferably optimized by the combination with the binder to be used. The pH range is from 4 to 12, preferably from 7 to 10. Ferromagnetic metal powders may be surface-treated to form at least a part of their surfaces covered with at least one compound selected from the group consisiting of oxide of Al, and Si. The amount thereof is from 0.1 to 10 wt % based on the ferromagnetic metal powders. Adsorption of a lubricant, e.g., fatty acid, becomes 100 mg/m$^2$ or less by conducting a surface treatment, which is, therefore, preferred. Soluble inorganic ions (e.g., Na, Ca, Fe, Ni, Sr, etc.) are sometimes contained in ferromagnetic metal powders. The properties of ferromagnetic metal powders are not particularly affected if the content is 200 ppm or less.

Ferromagnetic metal powders for use in the present invention preferably have less voids and the value thereof is 20% by volume or less, more preferably 5% by volume or less.

The shape of ferromagnetic metal powders is preferably an acicular shape but any shape such as a granular, ellipsoidal or tabular shape may be used.

The lower layer which is used in the preferred embodiment of the present invention is described in detail below.

Nonmagnetic inorganic powders contained in the lower layer of the present invention can be selected from inorganic compounds such as metal oxide, metal carbonate, metal sulfate, metal nitride, metal carbide, metal sulfide, etc. Examples of inorganic compounds are selected from the following compounds and they can be used alone or in combination, e.g., α-alumina having an alpha-conversion of 90% or more, β-alumina, γ-alumina, θ-alumina, silicon carbide, chromium oxide, cerium oxide, α-iron oxide, goethite, corundum, silicon nitride, titanium carbide, titanium oxide, silicon dioxide, stannic oxide, magnesium oxide, tungsten oxide, zirconium oxide, boron nitride, zinc oxide, calcium carbonate, calcium sulfate, barium sulfate, and molybdenum disulfide. Of these compounds, particularly preferred are titanium dioxide, zinc oxide, iron oxide and barium sulfate, more preferred are titanium dioxide and α-iron oxide, and most preferred is α-iron oxide.

These nonmagnetic inorganic powders preferably have a particle size of 3 µm or less. If desired, a plurality of nonmagnetic inorganic powders each having a different particle size may be combined, or a single nonmagnetic inorganic powder having a broad particle size distribution may be employed so as to attain the same effect as such combination. A particularly preferred particle size of the nonmagnetic inorganic powders is from 0.01 to 0.2 µm. In particular, when the nonmagnetic inorganic powder is a granular metal oxide, the average particle size thereof is preferably 0.08 µm or less, and when it is an acicular metal oxide, the average long axis length thereof is preferably 0.3 µm or less, more preferably 0.2 µm or less. The particle size of nonmagnetic inorganic powders can be measured in the same manner as the measurement of the particle size of ferromagnetic metal powders as described above. Nonmagnetic inorganic powders for use in the present invention have a tap density of from 0.05 to 2 g/ml, preferably from 0.2 to 1.5 g/ml; a water content of from 0.1 to 5 wt %, preferably from 0.2 to 3 wt %, and more preferably from 0.3 to 1.5 wt %; a pH value of from 2 to 11, particularly preferably between 7 and 10; a specific surface area ($S_{BET}$) of from 1 to 100 m$^2$/g, preferably from 5 to 70 m$^2$/g, and more preferably from 10 to 65 m$^2$/g; a crystallite size of from 0.004 to 1 µm, more preferably from 0.04 to 0.1 µm; an oil absorption amount using DBP (dibutyl phthalate) of from 5 to 100 ml/100 g, preferably from 10 to 80 ml/100 g, and more preferably from 20 to 60 ml/100 g; and a specific gravity of from 1 to 12, preferably from 3 to 6. The shape of nonmagnetic inorganic powders may be any of an acicular, spherical, polyhedral, or tabular shape.

Ignition loss of nonmagnetic inorganic powders is preferably 20 wt % or less but most preferably they have originally no ignition loss. Nonmagnetic inorganic powders for use in the present invention preferably have a Mohs' hardness of from 4 to 10. The surface roughness factor of these powders is preferably from 0.8 to 1.5, more preferably from 0.9 to 1.2. The SA (stearic acid) absorption amount of nonmagnetic inorganic powders is preferably from 1 to 20 µmol/m$^2$, more preferably from 2 to 15 µmol/m$^2$. The heat of wetting in water at 25° C. of nonmagnetic inorganic powders is preferably from 200 to 600 erg/cm$^2$. Solvents having the heat of wetting within this range can be used in the present invention. The appropriate number of water molecule of the surface at from 100 to 400° C. is from 1 to 10/100 Å. pH of isoelectric point in water is preferably from 3 to 9.

At least a part of the surfaces of these nonmagnetic inorganic powders are preferably covered with $Al_2O_3$, $SiO_2$, $TiO_2$, $ZrO_2$, $SnO_2$, $Sb_2O_3$, or ZnO. Preferred in the point of dispersibility are $Al_2O_3$, $SiO_2$, $TiO_2$ and $ZrO_2$, and more preferred are $Al_2O_3$, $SiO_2$ and $ZrO_2$. They can be used in combination or alone. A method in which the surface treatment may be performed by coprecipitation or, alternatively, surface treatment of particles may be previously performed to be covered with alumina in the first place, then the alumina-covered surface is covered with silica, or vice versa, according to purposes. The surface-covering layer may be porous layer, if necessary, but a homogeneous and dense surface is generally preferred.

Specific examples of nonmagnetic inorganic powders for use in the lower layer according to the present invention include Nanotite (manufactured by Showa Denko Co., Ltd.), HIT-110 and ZA-G1 (manufactured by Sumitomo Chemical Co., Ltd.), DPN-250, DPN-250BX, DPN-245, DPN-270BX, DPB-550BX, and DPN-550RX (manufactured by Toda Industrial Co., Ltd.), titanium oxide TTO-51B, TTO-55A, TTO-55B, TTO-55C, TTO-55S, TTO-55D, SN-100, MJ-7, α-iron oxide E-270, E271, and E300 (manufactured by Ishihara Sangyo Kaisha Ltd.), STT-4D, STT-30D, STT-30, and STT-65C (manufactured by Titan Kogyo Co., Ltd.), MT-100S, MT-100T, MT-150W, MT-500B, MT-600B, MT-100F, and MT-500HD (manufactured by Teika Co., Ltd.), FINEX-25, BF-1, BF-10, BF-20, and ST-M (manufactured by Sakai Chemical Industry Co., Ltd.), DEFIC-Y and DEFIC-R (manufactured by Dowa Mining Co., Ltd.), AS2BM and TiO2P25 (manufactured by Nippon Aerosil Co., Ltd.), 100A and 500A (manufactured by Ube Industries Co., Ltd.), and Y-LOP and calcined product thereof (manufactured by Titan Kogyo Co., Ltd.).

Particularly preferred nonmagnetic inorganic powders are titanium dioxide and α-iron oxide. Preparation of α-iron oxide (hematite) is performed as follows. α-$Fe_2O_3$ powders are obtained from acicular goethite particles as precursor particles. Acicular goethite particles are obtained by any of the following ordinary methods: (1) a method in which an aqueous alkali hydroxide solution is added to an aqueous ferrous salt solution in equivalent or more amount to thereby obtain a suspension having pH of 11 or more containing ferrous hydroxide colloid, then an oxygen-containing gas is introduced to the suspension obtained at 80° C. or less to form acicular goethite particles by the oxidation reaction, (2) a method in which an aqueous ferrous salt solution is reacted with an aqueous alkali carbonate solution to thereby obtain a suspension containing $FeCO_3$, then an oxygen-containing gas is introduced to the suspension obtained to form spindle-like goethite particles by the oxidation reaction, (3) a method in which an aqueous alkali hydroxide solution or an aqueous alkali carbonate solution is added to an aqueous ferrous salt solution in the amount of less than equivalent, thereby an aqueous ferrous salt solution containing ferrous hydroxide colloid is obtained, then an oxygen-containing gas is introduced to the aqueous ferrous salt solution obtained to form acicular goethite nucleus particles by the oxidation reaction, thereafter an aqueous alkali hydroxide solution is added to the aqueous ferrous salt solution containing the acicular goethite nucleus particles in the amount of equivalent or more based on $Fe^{2+}$ in the aqueous ferrous salt solution, then again an oxygen-containing gas is introduced to the aqueous ferrous salt solution to grow the acicular goethite nucleus particles, and (4) a method in which an aqueous alkali hydroxide solution or an aqueous alkali carbonate solution is added to an aqueous ferrous salt solution in the amount of less than equivalent, thereby an aqueous ferrous salt solution containing ferrous hydroxide colloid is obtained, then an oxygen-containing gas is introduced to the aqueous ferrous salt solution obtained to form acicular goethite nucleus particles by the oxidation reaction, thereafter the acicular goethite nucleus particles are grown in an acidic or neutral area.

Further, different kinds of elements such as Ni, Zn, P or Si, which are generally added to the reaction solution during the goethite particle-forming reaction for improving the properties of the powder, may be added.

Acicular α-$Fe_2O_3$ particles can be obtained by dehydrating acicular goethite particles, which are precursor particles, in the range of 200 to 500° C. and further, if necessary, annealing the particles by heat treatment at 350 to 800° C.

A sintering inhibitor such as P, Si, B, Zr or Sb may be adhered to the surface of acicular goethite particles to be dehydrated or annealed.

The reason why annealing by heat treatment at 350 to 800° C. is conducted is because it is preferred to fill the voids which have occurred on the surface of acicular α-$Fe_2O_3$ particles obtained by the dehydration by melting the extreme surface of particles to obtain smooth surfaces.

The above acicular α-$Fe_2O_3$ particles obtained by dehydration or annealing are dispersed in an aqueous solution to make a suspension, Al compounds are added to adjust the pH, the surfaces of acicular α-$Fe_2O_3$ particles are covered with the above-described additives, then filtering, washing, drying, pulverizing and, if necessary, other treatments such as deaeration, compaction and the like are conducted. Aluminum salt such as aluminum acetate, aluminum sulfate, aluminum chloride, and aluminum nitrate, and aluminic acid alkali salt such as sodium aluminate can be used as the aluminum compound to be used. In this case, the addition amount of the Al compound is from 0.01 to 50% by weight in terms of Al based on the α-$Fe_2O_3$ powder. The surface covering treatment can be performed using one or two or more selected from the group consisting of P, Ti, Mn, Ni, Zn, Zr, Sn and Sb, as well as Si compound, together with Al compounds. The content of these compounds used together with Al compounds is in general each from 0.01 to 50% by weight based on the α-$Fe_2O_3$ powder.

The producing method of titanium dioxide is as follows. The producing method of titanium dioxide mainly comprises a sulfuric acid process and a chlorine process. A sulfuric acid process comprises digesting raw ores of ilmenite with sulfuric acid and extracting Ti and Fe as sulfate. Iron sulfate is removed by crystallization-separation, the resulting titanyl sulfate solution is purified by filtration, water-containing titanium oxide is precipitated by thermal hydrolysis, the precipitated product is filtrated and washed, impurities are removed by washing, then a particle size-adjusting agent is added and calcined at 80 to 1,000° C., thereby crude titanium oxide is obtained. A rutile type and an anatase type are separated by the kind of nucleating agent added at hydrolysis. This crude titanium oxide is pulverized, graded, and surface treated. In a chlorine process, natural rutile and synthetic rutile are used as raw ores. Ores are chlorinated in a high temperature reduction state, Ti becomes $TiCl_4$ and Fe becomes $FeCl_2$, and the iron oxide solidified by cooling is separated from the liquid $TiCl_4$. The crude $TiCl_4$ obtained is purified by fraction, then a nucleating agent is added thereto and reacted with oxygen instantaneously at 1,000° C. or more, thereby crude titanium oxide is obtained. The finishing method for imparting to the crude titanium oxide formed in the oxidation decomposition process the property of pigment is the same as in the sulfuric acid process.

After the above titanium oxide material is dry ground, water and a dispersant are added, grains are wet ground, and coarse grains are classified by means of a centrifugal separator. Subsequently, a fine grain slurry is put in a surface treatment bath and surface covering with metal hydroxide is conducted here. In the first place, a predetermined amount of an aqueous solution of salts such as Al, Si, Ti, Zr, Sb, Sn, Zn is added to the tank, acid or alkali is added to neutralize the solution, and surfaces of titanium oxide particles are covered with the water-containing oxide produced. The water-soluble salts by-produced are removed by decantation, filtration and washing, the pH of the slurry is adjusted finally and filtrated, and washed with pure water. The washed cake is dried using a spray drier or a band drier. The dried product is finally ground by jet milling, thereby the product is obtained. Besides the water system, it is also possible to perform surface treatment by introducing $AlCl_3$ and $SiCl_4$ vapor to the titanium oxide powder, then water vapor is flowed to conduct surface treatment. With respect to other producing methods of pigments, G. D. Parfitt and K. S. W. Sing, *Characterization of Powder Surfaces*, Academic Press (1976) can be referred to.

By the incorporation of carbon blacks into the lower layer, a desired micro Vickers' hardness can be obtained in addition to the well-known effects reducing Rs and light transmittance.

A micro Vickers' hardness of the lower layer is generally from 25 to 60 kg/mm$^2$, preferably from 30 to 50 kg/mm$^2$. Measurement of a micro Vickers' hardness is conducted by means of a thin film hardness meter HMA-400 manufactured by NEC Co., Ltd. which uses a diamond-made triangular pyramid needle having an edge angle of 80° and a tip radius of 0.1 μm provided at the tip of the indentator. Light transmittance is standardized such that the absorption of infrared ray of wavelength of 900 nm or so is in general 3% or less, e.g., the absorption in VHS should be 0.8% or less. Furnace black for rubbers, thermal black for rubbers, carbon black for coloring, acetylene black, etc. can be used therefor.

Carbon blacks for use in the lower layer according to the present invention have a specific surface area ($S_{BET}$) of generally from 100 to 500 m$^2$/g, preferably from 150 to 400 m$^2$/g, a DBP absorption of generally from 20 to 400 ml/100 g, preferably from 30 to 200 ml/100 g, an average particle size of generally from 5 to 80 mμ, preferably from 10 to 50 mμ, and more preferably from 10 to 40 mμ, pH of generally from 2 to 10, a water content of from 0.1 to 10%, and a tap density of from 0.1 to 1 g/ml. Specific examples of carbon blacks for use in the present invention include BLACK-PEARLES 2000, 1300, 1000, 900, 800, 880 and 700 and VULCAN XC-72 (manufactured by Cabot Co., Ltd.), #3050B, #3150B, #3250B, #3750B, #3950B, #950, #650B, #970B and #850B, MA-600 (manufactured by Mitsubishi Kasei Corp.), CONDUCTEX SC, RAVENS 8800, 8000, 7000, 5750, 5250, 3500, 2100, 2000, 1800, 1500, 1255 and 1250 (manufactured by Columbia Carbon Co., Ltd.), and Ketjen Black EC (manufactured by Akzo Co., Ltd.). Carbon blacks for use in the present invention may previously be surface-treated with a dispersant, may be grafted with a resin, or a part of surfaces thereof may be graphitized before use. Carbon blacks may be previously dispersed in a binder before addition to the coating solution. Carbon blacks can be used within the range not exceeding 50% by weight based on the above nonmagnetic inorganic powders and not exceeding 40% by weight based on the total weight of the nonmagnetic layer. These carbon blacks can be used alone or in combination.

Regarding carbon blacks for use in the lower layer according to the present invention, for example, the disclosure in *Handbook of Carbon Blacks* (edited by Carbon Black Association of Japan) may be referred to.

Organic powders can be used in the lower layer according to the purpose. Examples of such organic powders include an acryl styrene resin powder, a benzoguanamine resin powder, a melamine resin powder, and a phthalocyanine pigment. In addition, a polyolefin resin powder, a polyester resin powder, a polyamide resin powder, a polyimide resin powder, and a polyethylene fluoride resin powder can also be used.

An undercoating layer is provided in a usual magnetic recording medium for the purpose of improving the adhesive strength between the support and the magnetic layer or the lower nonmagnetic layer. Polyesters soluble in a solvent are used for this sake, and the thickness is in general 0.5 μm or less.

Binder resins, lubricants, dispersants, additives, solvents, dispersing methods, etc., used for the magnetic layer can be used in the lower layer. In particular, with respect to the amounts and the kinds of binder resins, the amounts and the kinds of additives and dispersants, well-known prior art techniques regarding the magnetic layer can be applied in the lower layer.

Thermoplastic resins having a glass transition temperature of from −100 to 150° C., a number average molecular weight of from 1,000 to 200,000, preferably from 10,000 to 100,000, and a polymerization degree of about 50 to about 1,000 can be used in the magnetic layer and the lower layer of the present invention. Examples thereof include polymers or copolymers containing as a constituting unit the compounds, such as vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal and vinyl ether; polyurethane resins and various rubber resins.

Examples of thermosetting resins and reactive resins usable in the present invention include phenol resins, epoxy resins, curable type polyurethane resins, urea resins, melamine resins, alkyd resins, acrylic reactive resins, formaldehyde resins, silicone resins, epoxy-polyamide resins, mixtures of polyester resins and isocyanate prepolymers, mixtures of polyesterpolyol and polyisocyanate, and mixtures of polyurethane and polyisocyanate. Details on these resins are described in *Plastic Handbook*, published by Asakura Shoten. It is also possible to use well-known electron beam curable type resins in the lower layer and the upper layer.

These resins can be used alone or in combination. Examples of preferred combinations include at least one selected from vinyl chloride resins, vinyl chloride-vinyl acetate resins, vinyl chloride-vinyl acetate-vinyl alcohol resins, and vinyl chloride-vinyl acetate-maleic anhydride copolymers with polyurethane resins, or combinations of these resins with polyisocyanate. As polyurethane resins, those having well-known structures can be used, e.g., polyester polyurethane, polyether polyurethane, polyether polyester polyurethane, polycarbonate polyurethane, polyester polycarbonate polyurethane, polycaprolactone polyurethane, polyolefin polyurethane, etc. In particular, the above-described described polyurethanes comprising short chain diol units having a cyclic structure and long chain diol units containing an ether group are preferred. Preferably, at least one polar group selected from the following groups is introduced into the above binders by copolymerization or addition reaction for the purpose of further improving the dispersibility and the durability, e.g., —COOM, —SO$_3$M, —OSO$_3$M, —P=O(OM)$_2$, —O—P=O(OM)$_2$ (wherein M represents a hydrogen atom, or an alkali metal salt group), —OH, —NR$_2$, —N$^+$R$_3$ (R represents a hydrocarbon group), an epoxy group, —SH, —CN, sulfobetaine, phosphobetaine, or carboxybetaine. The content of the polar group is from $10^{-1}$ to $10^{-8}$ mol/g, preferably from $10^{-2}$ to $10^{-6}$ mol/g.

Specific examples of binders for use in the present invention include VAGH, VYHH, VMCH, VAGF, VAGD, VROH, VYES, VYNC, VMCC, XYHL, XYSG, PKHH, PKHJ, PKHC, and PKFE (manufactured by Union Carbide Co., Ltd.), MPR-TA, MPR-TA5, MPR-TAL, MPR-TSN, MPR-TMF, MPR-TS, MPR-TM, and MPR-TAO (manufactured by Nisshin Chemical Industry Co., Ltd.), 1000W, DX80, DX81, DX82, DX83, and 100FD (manufactured by Electro Chemical Industry Co., Ltd.), MR-104, MR-105, MR-110, MR-100, 400X-110A (manufactured by Nippon Zeon Co., Ltd.), Nippollan N2301, N2302, and N2304 (manufactured by Nippon Polyurethane Co., Ltd.), Pandex T-5105, T-R3080, T-5201, Burnock D-400, D-210-80, Crisvon 6109 and 7209 (manufactured by Dainippon Chemicals and Ink.), Vylon UR8200, UR8300, RV530, and RV280 (manufactured by Toyobo Co., Ltd.), Daipheramine 4020, 5020, 5100, 5300, 9020, 9022, and 7020 (manufactured by Dainichi Seika K.K.), MX5004 (manufactured by Mitsubishi Kasei Corp.), Sunprene SP-150 and TIM-3003 (manufactured by Sanyo Chemical Industries Co. Ltd.), Salan F310 and F210 (manufactured by Asahi Chemical Industry Co., Ltd.), etc. Of these, preferred are MR-104, MR-110, UR-8200, UR-8300, UR-8700, and reaction products containing diols and organic diisocyanate as main components, and polyurethanes having a cyclic structure and an ether group is preferred.

When polyurethane is used in the present invention, the polyurethane preferably has breaking extension of from 100 to 2,000%, breaking stress of from 0.05 to 10 kg/cm$^2$, and a yielding point of from 0.05 to 10 kg/cm$^2$.

Examples of the polyisocyanates which are preferably used in the present invention include isocyanates, e.g., tolylenediisocyanate, 4,4'-diphenylmethanediisocyanate, hexamethylenediisocyanate, xylylenediisocyanate, naphthylene-1,5-diisocyanate, o-toluidinediisocyanate, isophoronediisocyanate, and triphenylmethanetriisocyanate; reaction products of these isocyanates with polyalcohols; and polyisocyanates formed by condensation reaction of isocyanates. These polyisocyanates are commercially available under the trade names of Coronate L, Coronate HL, Coronate 2030, Coronate 2031, Millionate MR, and Millionate MTL (manufactured by Nippon Polyurethane Co., Ltd.), Takenate D-102, Takenate D-110N, Takenate D-200, and Takenate D-202 (manufactured by Takeda Chemical Industries, Ltd.), and Desmodure L, Desmodure IL, Desmodure N, and Desmodure HL (manufactured by Sumitomo Bayer Co., Ltd.). These may be used alone or in combinations of two or more thereof, taking advantage of a difference in curing reactivity in the lower layer and the upper layer. These polyisocyanates are used in the upper layer in an amount of generally from 0 to 50% by weight, preferably from 0 to 30% by weight, based on the total weight of the binder resin in the upper layer, and in the lower layer in an amount of generally from 0 to 40% by weight, preferably from 0 to 25% by weight, based on the total weight of the binder resin in the lower layer.

When the magnetic recording medium according to the present invention comprises two or more layers, the amount of the binder resins, the amounts of vinyl chloride resins, polyurethane resins, polyisocyanate resins or other resins contained in the binder, the molecular weight of each resin constituting the magnetic layer, the amount of polar groups, or the above-described physical properties of resins can of course be varied in the lower layer and the upper layer, according to necessity. Well-known techniques with respect to multilayered magnetic layers can be used in the present invention.

Carbon blacks exemplified above for use in the nonmagnetic layer can be applied to the magnetic layer.

Carbon blacks may be previously dispersed in a binder before addition to the magnetic coating solution. These carbon blacks may be used alone or in combination. Carbon blacks are used in an amount of from 0.1 to 10 wt %, preferably from 0.1 to 3 wt %, and more preferably from 0.5 to 1.5 wt %, based on the weight of the ferromagnetic metal powder. Carbon blacks can serve various functions such as preventing static charges, reducing a friction coefficient, imparting a light-shielding property and improving a film strength. Such functions vary depending upon the kind of carbon blacks to be used. Accordingly, it is of course possible in the present invention to select and determine the kinds, the amounts and the combinations of the carbon blacks to be added to the upper layer and the lower layer, on the basis of the above mentioned various properties such as the particle size, the oil absorption amount, the electro-conductivity and the pH value. Regarding carbon blacks for use in the magnetic layer of the present invention, for example, the disclosure in *Handbook of Carbon Blacks* (edited by Carbon Black Association of Japan) can be referred to.

As the abrasive usable in the present invention, well-known materials essentially having a Mohs' hardness of 6 or more may be used alone or in combination. Examples of such abrasives include α-alumina having an alpha-conversion rate of 90% or more, β-alumina, silicon carbide, chromium oxide, cerium oxide, α-iron oxide, corundum, artificial diamond, silicon nitride, silicon carbide, titanium carbide, titanium oxide, silicon dioxide, and boron nitride. Composites composed of these abrasives (abrasives obtained by surface-treating with other abrasives) may also be used. Compounds or elements other than the main component are often contained in these abrasives, but the intended effect can be attained so far as the content of the main component is 90% or more. Abrasives preferably have an average particle size of from 0.01 to 2 μm but a plurality of abrasives each having a different particle size may be combined according to necessity, or a single abrasive having a broad particle size distribution may be employed so as to attain the same effect as such a combination. Preferably, abrasives for use in the present invention have a tap density of from 0.3 to 2 g/ml, a water content of from 0.1 to 5%, a pH value of from 2 to 11 and a specific surface area ($S_{BET}$) of from 1 to 30 m$^2$/g.

The shape of the abrasives to be used in the present invention may be any of acicular, spherical and die-like shapes. Preferably, the abrasives have a shape partly with edges, because a high abrasive property is given. Specific examples of abrasives for use in the present invention include AKP-20, AKP-30, AKP-50, HIT-50, HIT-60, HIT-70, HIT-80, HIT-80G, and HIT-100 (manufactured by Sumitomo Chemical Co., Ltd.), G-5, G-7, S-1 (manufactured by Nippon Chemical Industrial Co., Ltd.), and TF100 and TF140 (manufactured by Toda Kogyo Co., Ltd.). It is of course possible in the present invention to select and determine the kinds, the amounts and the combinations of the abrasives to be added to the upper layer and the lower layer according to purposes. These abrasives may be previously dispersed in a binder before addition to the magnetic coating solution. The number of abrasives present on the surface and the edge surface of the magnetic layer of the magnetic recording medium according to the present invention is preferably 5/100 μm$^2$ or more.

As additives which can be used in the present invention, those having a lubrication effect, an antistatic effect, a dispersing effect and a plasticizing effect may be used. Examples of additives which can be used in the present invention include molybdenum disulfide, tungsten disulfide, graphite, boron nitride, fluorinated graphite, silicone oil, polar group-containing silicons, fatty acid-modified silicons, fluorine-containing silicons, fluorine-containing alcohols, fluorine-containing esters, polyolefins, polyglycols, alkyl phosphates and alkali metal salts thereof, alkyl sulfates and alkali metal salts thereof, polyphenyl ethers, fluorine-containing alkyl sulfates and alkali metal salts thereof, monobasic fatty acids having from 10 to 24 carbon atoms (which may contain an unsaturated bond or which may be branched) and metal salts thereof (e.g., with Li, Na, K or Cu), mono-, di-, tri-, tetra-, penta- or hexa-alcohols having from 12 to 22 carbon atoms (which may contain an unsaturated bond or which may be branched), alkoxy alcohols having from 12 to 22 carbon atoms (which may contain an unsaturated bond or which may be branched), mono-fatty acid esters, di-fatty acid esters or tri-fatty acid esters composed of a monobasic fatty acid having from 10 to 24 carbon atoms (which may contain an unsaturated bond or which may be branched) and any one of mono-, di-, tri-, tetra-, penta- and hexa-alcohols having from 2 to 12 carbon atoms (which may contain an unsaturated bond or which may be branched), fatty acid esters of monoalkyl ethers of alkylene oxide polymers, fatty acid amides having from 8 to 22 carbon atoms, and aliphatic amines having from 8 to 22 carbon atoms.

Specific examples of such additives include lauric acid, myristic acid, palmitic acid, stearic acid, behenic acid, butyl stearate, oleic acid, linolic acid, linolenic acid, elaidic acid, octyl stearate, amyl stearate, isooctyl stearate, octyl myristate, butoxyethyl stearate, anhydro-sorbitan monostearate, anhydro-sorbitan distearate, anhydro-sorbitan tristearate, oleyl alcohol, and lauryl alcohol. Additionally, examples of other additives which may be used include nonionic surfactants such as alkylene oxides, glycerols, glycidols and alkylphenol-ethylene oxide adducts; cationic surfactants such as cyclic amines, ester amides, quaternary ammonium salts, hydantoin derivatives, heterocyclic compounds, phosphoniums and sulfoniums; anionic surfactants containing an acidic group such as carboxylic acid, sulfonic acid, phosphoric acid, sulfate groups or phosphate groups; and amphoteric surfactants such as amino acids, aminosulfonic acids, sulfates or phosphates of amino alcohols and alkylbetains. The details of these surfactants are described in *Handbook of Surfactants* (published by Sangyo Tosho Co., Ltd.). These lubricants and antistatic agents are not always be 100% pure and may contain impurities such as isomers, non-reacted materials, byproducts, decomposed products and oxides, in addition to the main component. However, the content of such impurities is preferably 30% or less, more preferably 10% or less.

The kind and amount of these lubricant and surfactant for use in the lower layer and the magnetic layer can be properly selected in accordance with the purpose. For example, the lower layer and the magnetic layer can separately contain different fatty acids each having a different melting point so as to control bleeding out of the fatty acids to the surface, or different esters each having a different boiling point or a different polarity so as to control bleeding out of the esters to the surface. Also, the amounts of surfactants are controlled so as to improve the coating stability, or the amount of the lubricant in the lower layer is made larger so as to improve the lubrication effect of the surface thereof. Examples are by no means limited thereto.

All or a part of the additives to be used in the present invention may be added to the magnetic coating solution in any step of the preparation. For example, additives may be blended with a ferromagnetic metal powder before the kneading step, may be added during the step of kneading a ferromagnetic metal powder, a binder and a solvent, may be added during the dispersing step, may be added after the dispersing step, or may be added immediately before coating. According to the purpose, there is a case of capable of attaining the object by coating all or a part of the additives simultaneously with or successively after the coating of the magnetic layer. According to the purpose, lubricants may be coated on the surface of the magnetic layer after the calendering treatment or after the completion of slitting.

Examples of commercially available lubricants which can be used in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, castor oil-hardened fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monogri MB, Nonion DS-60, Anon BF, Anon LG, butyl stearate, butyl laurate and erucic acid (manufactured by Nippon Oils and Fats Co.); oleic acid (manufactured by Kanto Chemical Co.); FAL-205 and FAL-123 (manufactured by Takemoto Oils and Fats Co.); Enujerubu LO, Enujerubu IPM and Sansosyzer E4030 (manufactured by Shin Nihon Rika Co., Ltd.); TA-3, KF-96, KF-96L, KF-96H, KF410, KF420, KF965, KF54, KF50, KF56, KF907, KF851 X-22-819, X-22-822, KF905, KF700, KF393, KF-857, KF-860, KF-865, X-22-980, KF-101, KF-102, KF-103, X-22-3710, X-22-3715, KF-910 and KF-3935 (manufactured by Shin-Etsu Chemical Co.); Armide P, Armide C and Armoslip CP (manufactured by Lion Ahmer Co. Ltd.); Duomin TDO (manufactured by Lion Fat and Oil Co. Ltd.); BA-41G (manufactured by Nisshin Oil Mills Co., Ltd.); Profan 2012E, Newpole PE61, Ionet MS-400, Ionet MO-200, Ionet DL-200, Ionet DS-300, Ionet DS-1000 and Ionet DO-200 (manufactured by Sanyo Chemical Co. Ltd.).

Organic solvents for use in the present invention may be used in an optional proportion. Examples of suitable organic solvents include ketones such as acetone, methyl ethyl ketone, methyl isobutyl ketone, diisobutyl ketone, cyclohexanone, isophorone, tetrahydrofuran; alcohols such as methanol, ethanol, propanol, butanol, isobutyl alcohol, isopropyl alcohol and methylcyclohexanol; esters such as methyl acetate, butyl acetate, isobutyl acetate, isopropyl acetate, ethyl lactate and glycol acetate; glycol ethers such as glycol dimethyl ether, glycol monoethyl ether and dioxane; aromatic hydrocarbons such as benzene, toluene, xylene, cresol and chlorobenzene; chlorinated hydrocarbons such as methylene chloride, ethylene chloride, carbon tetrachloride, chlorofrom, ethylenechlorohydrin and dichlorobenzene; N,N-dimethylformamide, dimethylacetamide, and hexane. The organic solvents for use in the present invention may not necessarily be 100% pure and may contain impurities such as isomers, non-reacted materials, byproducts, decomposed products, oxides and water, in addition to the main component. However, the content of such the impurities is preferably 30% or less, more preferably 10% or less. The kinds of the organic solvents to be used in the magnetic layer and the lower layer of the present invention are preferably the same. The contents thereof may be varied. For instance, a solvent having a high surface tension (for example, cyclohexanone or dioxane) is used in the lower layer so as to improve the coating stability. Specifically, it is essential that the arithmetic mean value of the solvent composition of the upper layer be higher than that of the lower layer. For the improvement of the dispersibility, the polarity is preferably high in some degree. It is preferred that a solvent having electroconductivity of from 15 to 20 is contained in an amount of 50% by weight or more of the solvent composition. The solubility parameter is preferably from 8 to 11.

The thickness of the support in the magnetic recording medium of the present invention is from 1 to 100 $\mu$m. In particular, the use of a thin support having a thickness of from 1 to 8 $\mu$m is effective.

The thickness adding the magnetic layer to the lower layer in the present invention is from $\frac{1}{100}$ to 2 times of the thickness of the support. Moreover, it is preferred to provide an adhesive layer between the support and the lower layer for adhesion improvement.

The thickness of the adhesive layer is from 0.01 to 2 $\mu$m, preferably from 0.02 to 0.5 $\mu$m. A back coating layer may be provided on the surface of the support which is opposite to the magnetic layer side. The thickness of the back coating layer is from 0.1 to 2 $\mu$m, preferably from 0.3 to 1.0 $\mu$m. Conventionally well-known adhesive layers and back coating layers can be used in the present invention.

The support according to the present invention has a micro Vickers' hardness of 75 kg/mm$^2$ or more and well-known films can be used, e.g., biaxially oriented polyethylene naphthalate, polyamide, polyimide, polyamideimide, aromatic polyamide, and polybenzoxazole. In particular, a support using aromatic polyamide or polyethylene naphthalate, which is available from Toray Industries Inc. as "Aramides" and from Asahi Chemical Industry Co., Ltd. as "Aramica" are preferred.

The support may be previously subjected to corona discharge treatment, plasma treatment, adhesion-enhancing treatment, heat treatment, or dust-removing treatment. The support for use in the present invention has a center line average surface roughness of the side of the support on which a magnetic layer is coated of from 0.1 nm to 10 nm, preferably from 0.2 nm to 6 nm, and more preferably from 0.5 nm to 4 nm. Further, it is desired that the support for use in the present invention not only has a small center line average surface roughness but also is free from coarse protrusions of 1 $\mu$m or more on the surface thereof. The surface roughness of the support may be independently controlled in accordance with the size and amount of the filler to be added to the support. Examples of fillers usable for this purpose include oxides or carbonates of Al, Ca, Si or Ti as well as fine powders of organic substances such as acrylic materials and melamine materials, they may be either crystalloid or amorphous. The surface roughness of the side on which the backing layer is coated is preferably coarser than that of the side on which the magnetic layer is coated to make compatible with running durability. The center line average surface roughness of the backing layer-coated side is preferably from 1 nm to 20 nm, more preferably from 2 nm to 8 nm. The surface roughness of the magnetic layer-coated side and the backing layer-coated side may be varied using a dual structural support, or may be varied by providing a coating layer.

The support for use in the present invention preferably has an F-5 value of from 10 to 50 kg/mm$^2$ in the tape-running direction and an F-5 value of from 10 to 30 kg/mm$^2$ in the transverse direction of the tape. In general, the F-5 value in the machine direction of the tape is higher than that in the transverse direction thereof. However, this arrangement does not apply to the case where the transverse strength of tape is intended to be especially elevated. The thermal shrinkage at 100° C. for 30 minutes of the support for use in the present invention is preferably 3% or less and more preferably 1.5% or less, in both the tape-running direction and the widthwise direction and further the thermal shrinkage at 80° C. for 30 minutes is preferably 1% or less, more preferably 0.5% or less in both directions. The breaking strength of the support is preferably from 5 to 100 kg/mm$^2$ in both directions, and the modulus of elasticity thereof is preferably from 100 to 2,000 kg/mm$^2$ in both directions.

Further, the light transmittance at 900 nm is preferably 30% or less, more preferably 3% or less.

The process of preparing magnetic coating solution for use in the magnetic recording medium of the present invention comprises at least a kneading step, a dispersing step and optionally blending steps to be carried out before and/or after the kneading and dispersing steps. Any of these respective steps may be composed of two or more separate stages. Materials such as a ferromagnetic metal powder, a binder, a carbon black, an abrasive, an antistatic agent, a lubricant, a solvent, and the like for use in the present invention may be added at any step at any time. Each material may be added at two or more steps dividedly. For example, a polyurethane resin can be added dividedly at a kneading step, a dispersing step, or a blending step for adjusting viscosity after dispersion. For achieving the object of the present invention, the above steps can be performed partly with conventionally well-known techniques. However, high Br (residual magnetic flux density) of the magnetic recording medium of the present invention can be obtained using powerful kneading machines such as a continuous kneader or a pressure kneader. When a continuous kneader or a pressure kneader is used, all or a part of the binder (preferably 30 wt % or more of the total binders) is kneading-treated in the range of from 15 parts to 500 parts per 100 parts of the ferromagnetic metal powder together with the ferromagnetic metal powder. Details of these kneading processes are disclosed in JP-A-1-166338 and JP-A-64-79274. When preparing a magnetic layer solution, a nonmagnetic layer solution, and a dispersion solution of abrasives, dispersing media having a high specific gravity are preferably used and zirconia beads are very suitable for this purpose.

Examples of apparatuses and methods for simultaneously multilayer coating providing a magnetic recording medium having a multilayer structure according to the present invention are described below.

1. In the first place, the lower layer is coated by any of a gravure coating, roll coating, blade coating, and extrusion coating apparatus, which are ordinarily used in the coating of a magnetic coating solution, and the upper magnetic layer is coated while the lower coating layer is still wet by means of the support pressing type extrusion coating apparatus disclosed in U.S. Pat. Nos. 4,480,583; 4,681,062; and 5,302,206.
2. The upper layer and the lower layer are coated almost simultaneously using the coating head equipped with two slits for feeding coating solution as disclosed in U.S. Pat. Nos. 4,854,262; 5,072,688; and 5,302,206.
3. The upper layer and the lower layer are coated almost simultaneously using the extrusion coating apparatus equipped with a backup roll as disclosed in JP-A-2-174965.

For preventing the reduction of the electromagnetic characteristics of the magnetic recording medium due to agglomeration of magnetic powders, it is preferred to impart shear to the coating solution in the coating head by methods as described in U.S. Pat. No. 4,828,779 and JP-A-1-236968. With respect to the viscosity of the coating solution, it is preferred to satisfy the range of the numeric values disclosed in U.S. Pat. No. 4,994,306.

The magnetic layer of the magnetic recording medium according to the present invention is preferably subjected to strong orientation. A magnetic tape is subjected to machine direction orientation and it is preferred to dispose a solenoid of 1,000 G or more, preferably 3,000 G or more and a cobalt magnet with the same pole and counter position, and it is preferred that orientation is performed by magnetic fields of 2,000 G or more, preferably 4,000 G or more, and more preferably 6,000 G or more. It is also preferred to provide appropriate drying step before orientation so that the orientation after drying becomes highest. A floppy disc is subjected to random orientation. Orientation conditions are the same with the case of a magnetic tape, i.e., after orientation in the machine direction, random orientation is performed, for example, by passing through an alternating current magnetic field generator having two magnetic field intensities of frequency of 50 Hz, magnetic field intensity of 250 Gauss and frequency of 50 Hz, magnetic field intensity of 120 Gauss.

It is also preferred to contrive to combine well-known means for improving adhesion, e.g., providing an adhesive layer comprising a polymer as a main component before simultaneous multilayer coating of the nonmagnetic layer and the magnetic layer, corona discharging, ultraviolet (UV) irradiation, or electron beam irradiation.

Use of heat resisting plastic rolls such as epoxy, polyimide, polyamide, polyimideamide, etc., or metal rolls is effective for calendering treatment. Treatment can also be performed using only metal rolls, only plastic rolls, or pair rolls of a metal roll and a plastic roll. Treatment temperature is preferably from 70 to 120° C., more preferably from 80 to 100° C. Line pressure is preferably from 200 to 500 kg/cm, more preferably from 300 to 400 kg/cm.

The surface of the magnetic layer and the opposite surface thereof of the magnetic recording material of the present invention have a friction coefficient to SUS420J of preferably from 0.1 to 0.5, more preferably from 0.2 to 0.3. The surface intrinsic resistivity of the magnetic layer is preferably from $10^4$ to $10^{12}$ Ω/sq, the modulus of elasticity at 0.5% elongation of the magnetic layer is preferably from 100 to 2,000 kg/mm² both in the running direction and the transverse direction, the breaking strength is preferably from 1 to 30 kg/cm², the modulus of elasticity of the magnetic recording medium is preferably from 100 to 1,500 kg/mm² both in the running direction and the transverse direction, the residual elongation is preferably 0.5% or less, and the thermal shrinkage at every temperature of 100° C. or less is preferably 1% or less, more preferably 0.5% or less, and most preferably 0.1% or less, ideally 0%. The glass transition temperature of the magnetic layer (the maximum of modulus of elasticity loss by dynamic visco-elasticity measurement at 110 Hz) is preferably from 30° C. to 150° C., and that of the lower layer is preferably from 0° C. to 100° C. The modulus of elasticity loss is preferably within the range of from $1\times10^8$ to $8\times10^9$ dyne/cm², and loss tangent is preferably 0.2 or less.

If loss tangent is large, adhesion failure is liable to occur. The residual solvent amount in the magnetic layer is preferably 100 mg/m² or less, more preferably 10 mg/m² or less, and the residual solvent amount in the upper magnetic layer is preferably smaller than that in the lower layer. The void ratio is preferably 30% by capacity or less, more preferably 20% by capacity or less, with any of the lower layer and the magnetic layer. The void ratio is preferably smaller in view of high output but in some cases a specific value is preferably secured depending on purposes. For example, in a magnetic recording medium for recording data which are repeatedly used, large void ratio contributes to good durability in many cases.

Magnetic characteristics of the magnetic recording medium according to the present invention, i.e., Hc, SFD, Bm and Br, are values measured at the magnetic field of 10 KOe by VSM (a vibrating sample magnetometer) unless otherwise indicated. In the case of the magnetic tape, in the running direction of the tape, Hc is as described above, and squareness ratio (SQ) is generally from 0.85 or more, preferably from 0.85 to 0.95. Two squareness ratios in the two directions making a right angle with the running direction of the tape, i.e., the direction parallel with the tape surface and crossing the tape orthogonally and the direction vertical to the tape surface, are preferably 80% or less. Remanence coercive force Hr in the machine direction is also preferably from 1,800 Oe to 3,000 Oe. Hc and Hr in the vertical direction are preferably from 1,000 Oe to 5,000 Oe.

It is preferred that the root mean surface roughness ($R_{RMS}$) of the magnetic layer which is measured using AFM (atomic force microscope) is preferably from 2 nm to 15 nm.

The magnetic recording medium according to the present invention preferably comprises a lower layer (i.e., a non-magnetic layer) and an upper layer (i.e., a magnetic layer), and these physical properties in the lower layer and the magnetic layer can be varied according to purposes. For example, the elastic modulus of the magnetic layer is made higher to improve running durability and at the same time the elastic modulus of the lower layer is made lower than that of the magnetic layer to improve the head touching of the magnetic recording medium. Further, it is effective in the present invention to improve the head touching by changing the tensirizing method of the support. In many cases, a support tensirized in the direction making a right angle with the machine direction of the tape rather shows good head touching.

In recent years, it has been possible to coat an extremely thin monolayer having a thickness of 0.5 µm or less with the advancement of extrusion coating techniques.

EXAMPLE

"Parts" in the following description shows "parts by weight" and "%" shows "% by weight" unless otherwise indicated.

Ferromagnetic Metal Powder

Properties and compositions of the ferromagnetic metal powders used in the preparation of the magnetic recording media are shown in Table 1 below.

TABLE 1

| Ferromagnetic Metal Powders | | | | |
| --- | --- | --- | --- | --- |
| | A | B | C | D |
| Hc (Oe) | 2,390 | 2,370 | 2,370 | 2,135 |
| $\sigma_s$ (emu/g) | 153 | 146 | 155 | 145 |
| SFD | 0.94 | 0.95 | 0.97 | 1.05 |
| Crystallite size (Å) | 160 | 150 | 160 | 135 |
| Average long axis length (µm) | 0.100 | 0.095 | 0.100 | 0.085 |
| $S_{BET}$ (m²/g) | 46 | 54 | 48 | 49 |
| Composition (atomic %) | | | | |
| Co/Fe | 30 | 30 | 30 | 30 |
| Al/Fe | 11.1 | 11.1 | 11.1 | 6.8 |
| Y/Fe | 6.7 | 6.7 | 6.7 | 7.9 |
| Mg/Fe | 0.8 | 0.8 | 0.8 | 1.0 |
| Ca/Fe | 0.05 | 0.08 | 0.04 | 0.01 |
| Na/Fe | 0.00 | 0.07 | 0.13 | 0.03 |

$S_{BET}$ shows a specific surface area measured by the BET method.

Preparation of Polyurethane Resin

Synthesis of Polyurethane Resin A

Diol HBpA represented by formula (1), diol BpA-PPO700 represented by formula (2) and other diols PPG400 and DEIS in the molar ratio of HBpA/BpA-PPO700/PPG400/DEIS of 24/14/10/2 were dissolved in a mixed solvent (50/50 by weight) of cyclohexanone and dimethylacetamide in a reaction vessel equipped with a reflux condenser and a stirrer, in the nitrogen atmosphere of which had been previously replaced with nitrogen, at 60° C. Di-n-dibutyltin dilaurate may be added thereto as a catalyst in an amount of 60 ppm based on the total amount of the starting materials used.

Next, MDI (4,4'-diphenylmethanediisocyanate) was added to the solution in the equimolar amount to the sum total of diols and reacted by heating at 90° C. for 6 hours, thereby Polyurethane Resin A containing 4.0 nmol/g of an ether group and $8 \times 10^{-5}$ mol/g of an —$SO_3Na$ group and having Mw of 45,000 and Mn of 25,000 was obtained.

Synthesis of Polyurethane Resin B

Polyurethane Resin B containing 1.3 nmol/g of an ether group and $8 \times 10^{-5}$ mol/g of an —$SO_3Na$ group was synthesized in the same manner as the synthesis of Polyurethane Resin A except that PCL400 was further used as other diol and the molar ratio of diols was changed to HBpA/BpA-PPO700/PCL400/PPG400/DEIS of 24/5/14/5/2.

Further, the abbreviations indicate the following.

HBpA: Hydrogenated bisphenol A (trade name: "Rikabinol HB, manufactured by New Japan Chemical Co., Ltd.)
BpA-PPO700: Polypropylene oxide adduct of bisphenol A (molecular weight: 700)
PCL400: Polycaprolactone polyol (molecular weight: 400)
PPG400: Polypropylene glycol (molecular weight: 400)
DEIS: Sodium salt of bis(2-hydroxyethyl)sulfoisophthalate Upper layer coating solutions and lower layer coating solutions as described below were prepared using the above ferromagnetic metal powders, Polyurethane Resin A and Polyurethane Resin B.

Formula of Coating Solution

Formula of Upper Layer Coating Solution

| | |
| --- | --- |
| Ferromagnetic metal powder (shown in Table 2) Properties and composition are shown in Table 1 | 100 parts |
| Vinyl chloride copolymer MR110 (manufactured by Nippon Zeon Co., Ltd., Japan) | shown in Table 2 |
| Polyurethane resin (A or B) | shown in Table 2 |
| Polyisocyanate Coronate L (manufactured by Nippon Polyurethane Industry Co., Ltd.) | shown in Table 2 |
| Phenylphosphonic Acid (PPA) | shown in Table 2 (mol/kg of ferromagnetic metal powder) |
| Carbon black (average particle size: 80 nm) | 1 part |
| Alumina (average particle size: 0.2 µm) | 5 parts |
| Stearic acid | 0.5 parts |
| Butyl stearate | 1.2 parts |
| Methyl ethyl ketone | 120 parts |
| Cyclohexanone | 120 parts |

| Formula of Lower Layer Coating Solution | |
|---|---|
| Nonmagnetic inorganic powder<br>α-Fe$_2$O$_3$ (hematite)<br>Long axis length: 0.15 μm<br>S$_{BET}$: 52 m$^2$/g<br>pH: 9<br>Tap density: 0.8<br>Surface-covering compound: Al$_2$O$_3$, SiO$_2$ | 85 parts |
| Carbon black<br>Average particle size: 20 nm | 15 parts |
| Vinyl chloride resin<br>MR104 (manufactured by Nippon Zeon Co., Ltd., Japan) | shown in Table 2 |
| Polyurethane resin (A or B) | shown in Table 2 |
| Polyisocyanate<br>Coronate L (manufactured by Nippon Polyurethane Industry Co., Ltd.) | shown in Table 2 |
| Phenylphosphonic Acid (PPA) | shown in Table 2<br>(mol/kg of<br>nonmagnetic<br>inorganic powder) |
| Stearic acid | 0.5 parts |
| Butyl stearate | 1.2 parts |
| Methyl ethyl ketone | 120 parts |
| Cyclohexanone | 120 parts |

Preparation of Magnetic Recording Medium

Example 1 to 6 and Comparative Examples 1 to 9

Each of the above compositions of the coating solutions for the upper layer and the lower layer were respectively kneaded and dispersed, then each solution was filtered through a filter having an average pore diameter of 1 μm to obtain each coating solution. These coating solutions were simultaneously multilayer-coated on a polyethylene naphthalate support having a thickness of 5.2 μm and a center line average surface roughness of 0.001 μm of the surface side on which a magnetic layer was to be coated. The lower layer coating solution was coated by reverse roll coating in a dry thickness of 1.2 μm, immediately thereafter the upper layer coating solution was coated on the lower layer so as to give the magnetic layer having a dry thickness as indicated in Table 2. The coated layers were oriented with a cobalt magnet having a magnetic force of 5,000 G and a solenoid having a magnetic force of 4,000 G while both layers were still wet. After drying, the coated layer was subjected to calendering treatment by passing seven (7) nips, each of which comprises a part of a metal roll and an epoxy resin roll, at 100° C. at a rate of 200 m/min. Subsequently, a backing layer having a thickness of 0.5 μm was coated. The obtained web was slit to a width of 6.35 mm, and then the resulting tape was wound on a supply real of DVC cassette, and thereby a magnetic tape for DVC video was obtained.

The characteristics of the thus obtained magnetic recording media of Examples and Comparative Examples were measured according to the following methods. The results obtained are shown in Table 2 below.

Evaluation Methods

Magnetic characteristics (Hc, σ$_s$, SFD, Bm, Br):

Magnetic characteristics were measured using a vibrating sample magnetometer (a product of Toei Kogyo Co., Ltd.) by Hm 10 KOe.

Average thickness d and standard deviation σ of the magnetic layer:

Measurement was conducted according to the above-described method.

Ra:

Central line average surface roughness Ra was measured using a digital optical profilometer (a product of WYKO, U.S.A.) by the light interference method under the conditions of a cut-off value of 0.25 mm.

1/2 Tb output:

Cam Coder DJ-1 (a product of Matsushita Industrial Co., Ltd.) was modified to Tb:BIT spacing and signal output at 1/2 Tb frequency (21 MHz) was measured. Recording electric current was according to deck command (recording wavelength λ=0.488 μm). REF tape "MTR1221" for DVC use was taken as 0 dB.

Further, −1 dB or more was taken as an adaptation standard.

1/90 Tb Output:

Cam Coder DJ-1 (a product of Matsushita Electric Industrial Co., Ltd.) was modified to Tb:BIT spacing and signal output at 1/90 Tb frequency (465 MHz) was measured. Recording electric current was according to deck command (recording wavelength λ=21.96 μm). REF tape "MTR1221" for DVC use was taken as 0 dB. In general, −1.0 dB or more is practicable, preferably −0.5 dB or more.

Further, −1 dB or more was taken as an adaptation standard.

1/75 Tb—O/W (overwriting):

In the standard of a digital video cassette recorder (VCR) for consumer use (SD specification), the value of 1/90 Tb overwriting is normalized, but for the direct measurement thereof, the tracking method must be modified largely. Therefore, as a wavelength not affecting the tracking work, 1/75 Tb overwriting characteristics were evaluated as the evaluation method taking the place of 1/90 Tb overwriting characteristics. Further, it has already been confirmed that 1/90 Tb overwriting performance almost coincides with 1/75 Tb overwriting performance. In the first place, signals at 1/75 Tb frequency were recorded on the above DJ-1 modified cam coder. Then, these 1/75 Tb signals were reproduced and the output was measured. Then, overwriting was performed using data signals and the erasure-remaining 1/75 Tb signals were measured with a spectrum analyzer. The difference between 1/75 Tb signal outputs before and after data signal recording was taken as O/W erasure factor. The same measurement was conducted using REF tape "MTR1221" for DVC use, and the difference therebetween was taken as 1/75 Tb signal O/W.

Further, +1 dB or less was taken as an adaptation standard.

TABLE 2

| | Ex. 1 | Ex. 2 | Ex. 3 | Ex. 4 | Ex. 5 | Ex. 6 |
|---|---|---|---|---|---|---|
| Formula of upper layer coating solution | | | | | | |
| Kind of ferromagnetic metal powder | A | B | C | C | C | C |
| Binder resin | | | | | | |
| MR110 | 0 | 0 | 0 | 0 | 0 | 2 |
| Polyurethane resin | A: 10 | A: 10 | A: 10 | A: 10 | A: 10 | A: 8 |
| Coronate L | 0 | 0 | 0 | 5 | 0 | 0 |
| Total amount | 10 | 10 | 10 | 15 | 10 | 10 |
| PPA | 0.32 | 0.32 | 0.32 | 0.32 | 0.32 | 0.32 |
| Formula of lower layer coating solution | | | | | | |
| Binder resin | | | | | | |
| MR104 | 10 | 10 | 10 | 10 | 10 | 10 |
| Polyurethane resin | A: 4.5 | A: 4.5 | A: 4.5 | A: 4.5 | B: 4.5 | A: 4.5 |
| Coronate L | 4.5 | 4.5 | 4.5 | 4.5 | 4.5 | 4.5 |
| Total amount | 19 | 19 | 19 | 19 | 19 | 19 |
| PPA | 0.19 | 0.19 | 0.19 | 0.19 | 0.19 | 0.19 |

TABLE 2-continued

|  | | | | | | |
|---|---|---|---|---|---|---|
| Average thickness d of the magnetic layer (μm) | 0.09 | 0.09 | 0.09 | 0.09 | 0.09 | 0.09 |
| Standard deviation σ of the magnetic layer thickness (μm) | 0.03 | 0.03 | 0.03 | 0.03 | 0.03 | 0.03 |
| Characteristics of the tape | | | | | | |
| Hc (Oe) | 2,350 | 2,370 | 2,300 | 2,350 | 2,330 | 2,280 |
| Bm (G) | 6,800 | 6,300 | 7,500 | 6,750 | 6,850 | 7,800 |
| Br (G) | 6,000 | 5,600 | 6,600 | 5,870 | 5,960 | 6,630 |
| SQ | 0.88 | 0.89 | 0.88 | 0.87 | 0.87 | 0.85 |
| SFD | 0.18 | 0.18 | 0.20 | 0.20 | 0.22 | 0.24 |
| Ra (nm) | 2.2 | 2.0 | 2.2 | 2.2 | 2.0 | 1.8 |
| ½ Tb output (dB) | +0.5 | +0 | +0.8 | +0.2 | +0.4 | +1.0 |
| 1/90 Tb output (dB) | 0 | −0.5 | +0.6 | 0 | 0 | +0.7 |
| 1/75 Tb-O/W (dB) | −0.2 | 0 | 0 | −0.2 | −0.4 | −1 |

|  | Comp. Ex. 1 | Comp. Ex. 2 | Comp. Ex. 3 | Comp. Ex. 4 | Comp. Ex. 5 |
|---|---|---|---|---|---|
| Formula of upper layer coating solution | | | | | |
| Kind of ferromagnetic metal powder | A | A | A | A | A |
| Binder resin | | | | | |
| MR110 | 12 | 6 | 0 | 0 | 0 |
| Polyurethane resin | A: 5 | A: 2 | A: 20 | A: 4 | A: 12 |
| Coronate L | 5 | 2 | 0 | 0 | 5 |
| Total amount | 22 | 10 | 20 | 4 | 17 |
| PPA | 0.19 | 0.19 | 0.32 | 0.32 | 0.19 |
| Formula of lower layer coating solution | | | | | |
| Binder resin | | | | | |
| MR104 | 10 | 10 | 10 | 10 | 14 |
| Polyurethane resin | A: 4.5 | A: 4.5 | A: 4.5 | A: 4.5 | A: 6 |
| Coronate L | 4.5 | 4.5 | 4.5 | 4.5 | 6 |
| Total amount | 19 | 19 | 19 | 19 | 26 |
| PPA | 0.19 | 0.19 | 0.19 | 0.19 | 0.19 |
| Average thickness d of the magnetic layer (μm) | 0.09 | 0.09 | 0.15 | 0.09 | 0.15 |
| Standard deviation σ of the magnetic layer thickness (μm) | 0.03 | 0.03 | 0.04 | 0.04 | 0.04 |
| Characteristics of the tape | | | | | |
| Hc (Oe) | 2,440 | 2,410 | 2,400 | 2,300 | 2,390 |
| Bm (G) | 4,500 | 5,200 | 5,400 | 7,400 | 5,500 |
| Br (G) | 3,820 | 3,900 | 4,860 | 5,770 | 4,680 |
| SQ | 0.85 | 0.75 | 0.90 | 0.78 | 0.85 |
| SFD | 0.33 | 0.40 | 0.16 | 0.35 | 0.32 |
| Ra (nm) | 1.8 | 2.2 | 3.0 | 3.2 | 2.6 |
| ½ Tb output (dB) | −2 | −1.5 | −1.2 | −2.5 | −1 |
| 1/90 Tb output (dB) | −1.8 | −1.2 | +1.4 | +0.5 | +1.7 |
| 1/75 Tb-O/W (dB) | +1 | +0.7 | +6 | +1.2 | +5 |

|  | Comp. Ex. 6 | Comp. Ex. 7 | Comp. Ex. 8 | Comp. Ex. 9 |
|---|---|---|---|---|
| Formula of upper layer coating solution | | | | |
| Kind of ferromagnetic metal powder | A | A | A | D |
| Binder resin | | | | |
| MR110 | 0 | 0 | 0 | 0 |
| Polyurethane resin | A: 10 | A: 10 | A: 10 | A: 8 |
| Coronate L | 0 | 0 | 0 | 0 |
| Total amount | 10 | 10 | 10 | 8 |
| PPA | 0.32 | 0 | 0.32 | 0.32 |
| Formula of lower layer coating solution | | | | |
| Binder resin | | | | |
| MR104 | 10 | 14 | 10 | 10 |
| Polyurethane resin | A: 4.5 | A: 6 | A: 4.5 | A: 4.5 |
| Coronate L | 4.5 | 6 | 4.5 | 4.5 |
| Total amount | 19 | 26 | 19 | 19 |
| PPA | 0.19 | 0.19 | 0.19 | 0.19 |
| Average thickness d of the magnetic layer (μm) | 0.10 | 0.10 | 0.25 | 0.10 |
| Standard deviation σ of the magnetic layer thickness (μm) | 0.03 | 0.06 | 0.05 | 0.04 |
| Characteristics of the tape | | | | |
| Hc (Oe) | 2,380 | 2,310 | 2,390 | 2,080 |
| Bm (G) | 6,000 | 7,200 | 5,800 | 6,000 |
| Br (G) | 4,620 | 4,896 | 5,050 | 5,340 |
| SQ | 0.77 | 0.68 | 0.87 | 0.89 |
| SFD | 0.38 | 0.52 | 0.20 | 0.24 |
| Ra (nm) | 3.0 | 4.2 | 2.4 | 2.1 |
| ½ Tb output (dB) | −3 | −6 | 0 | −2.2 |
| 1/90 Tb output (dB) | 0 | +0.4 | +4 | −0.1 |
| 1/75 Tb-O/W (dB) | +1.5 | +4 | +8 | −1.5 |

As is apparent from the results in Table 2, Comparative Examples 1, 2, 4 to 7 are examples respectively showing that SFD is larger than 0.30, Comparative Examples 3, 5 and 8 are examples respectively, showing that d does not satisfy $d \leq \lambda/4 = 0.122$ μm, and Comparative Example 9 is an example showing that the Hc value is low. For example, as Comparative Examples 1 and 2 are low in 1/2 Tb output and 1/90 Tb output and Comparative Example 3 is high in 1/75 Tb—O/W, these Comparative Examples do not satisfy the adaptation standard of at least one of three evaluation items. On the contrary, Examples of the present invention which satisfy all of SFD, d and Hc satisfy all evaluation items.

Effect of the Invention

The present invention can provide a magnetic recording medium which comprises a support having thereon a magnetic layer comprising a ferromagnetic metal powder and a binder resin, wherein coercive force (Hc) of the magnetic layer is from 2,100 to 3,000 Oe, SFD of the magnetic layer is 0.30 or less, and an average thickness: d of the magnetic layer is in the range of: $d \leq$ recording wavelength $\lambda/4$, and preferably saturation magnetization amount Bm of the magnetic layer is 6,000 G or more, and further, the present invention can provide a magnetic recording medium for DVC which satisfies each of 1/2 Tb output, 1/90 Tb output and O/W as the magnetic layer and the nonmagnetic layer are formed by simultaneous multilayer coating.

While the invention has been described in detail and with reference to specific examples thereof, it will be apparent to one skilled in the art that various changes and modifications can be made therein without departing from the spirit and scope thereof.

What is claimed is:

1. A magnetic recording medium which comprises a support having thereon a magnetic layer comprising a ferromagnetic metal powder and a binder resin, wherein coercive force (Hc) of said magnetic layer is from 2,100 to 3,000 Oe, the SFD (switching field distribution) of said magnetic layer is 03.0 or less, an average thickness: d of said magnetic layer is in the range of: $d \leq$ recording wavelength $\lambda/4$, and the residual magnetic flux density (Br) of said magnetic layer is 5,000 G or more.

2. The magnetic recording medium as claimed in claim 1, wherein said ferromagnetic metal powder has a specific surface area as measured by BET method of from 30 to 50 $m^2/g$, an average long axis length of from 0.05 to 0.15 μm, an acicular ratio of from 4 to 18, a pH of from 7 to 10.

3. The magnetic recording medium as claimed in claim 1, wherein the total weight of said binder resin based on the weight of said ferromagnetic metal powder contained in said magnetic layer is from 5 to 18% by weight.

4. The magnetic recording medium as claimed in claim 1, wherein said average thickness: d is 0.12 μm or less and a standard deviation σ of said magnetic layer thickness is 0.05 μm or less.

5. The magnetic recording medium as claimed in claim 1, wherein said ferromagnetic metal powder has Hc of from 2,200 to 3,000 Oe, a saturatation magnetization (σs) of from 140 to 170 emu/g, a crystallite size of from 100 to 170 Å and SFD of 1.0 or less.

6. The magnetic recording medium as claimed in claim 1, wherein said binder resin contained in said magnetic layer comprises a polyurethane resin in an amount of from 50 to 100% by weight based on the total weight of said binder resin.

7. The magnetic recording medium as claimed in claim 6, wherein said polyurethane resin has a breaking extension of from 100 to 2,000%, a breaking stress of from 0.05 to 10 $kg/cm^2$, and a yielding point of from 0.05 to 10 $kg/cm^2$.

8. The magnetic recording medium as claimed in claim 6, wherein said polyurethane resin comprises short chain diol units having a cyclic structure in an amount of from 17 to 40% by weight based on said polyurethane resin and long chain diol units containing from 1.0 to 5.0 mmol/g of an ether group based on said total polyurethane resin in an amount of from 10 to 50% by weight based on said polyurethane resin, as diol components.

9. The magnetic recording medium as claimed in claim 6, wherein said polyurethane resin has a number average molecular weight (Mn) of from 18,000 to 56,000, a weight average molecular weight (Mw) of from 30,000 to 100,000, and a glass transition temperature (Tg) of from 1 to 200° C.

10. The magnetic recording medium as claimed in claim 1, wherein said magnetic layer further comprises an aromatic organic acid compound in an amount of from 0.1 to 0.8 mol per kg of said ferromagnetic metal powder.

11. The magnetic recording medium as claimed in claim 10, wherein said aromatic organic acid is an organic acid or salt thereof having a pKa value of 3 or less.

12. The magnetic recording medium as claimed in claim 11, wherein said aromatic organic acid is at least one compound selected from the group consisting of α-naphthylphosphoric acid, phenylphosphoric acid, diphenylphosphoric acid, p-ethylbenzenephosphonic acid, phenylphosphonic acid, phenylphosphinic acid, methanesulfonic acid, benzenesulfonic acid, p-toluenesulfonic acid, naphthalene-α-sulfonic acid and naphthalene-β-sulfonic acid, and salts thereof.

13. The magnetic recording medium as claimed in claim 1, wherein said average thickness: d of said magnetic layer is from 0.05 to 0.1 μm and saturation deviation σ of the magnetic layer thickness is from 0.001 to 0.03 μm.

14. The magnetic recording medium as claimed in claim 1, wherein said magnetic recording medium has, between said support and said magnetic layer, a nonmagnetic layer comprising a nonmagnetic inorganic powder and a binder resin.

15. The magnetic recording medium as claimed in claim 14, wherein said binder resin contained in said nonmagnetic layer is contained in an amount of from 14 to 25 parts by weight per 100 parts by weight of the total amount of said nonmagnetic inorganic powder.

16. The magnetic recording medium as claimed in claim 15, wherein said binder resin contained in said nonmagnetic layer comprises a vinyl chloride based resin and a polyurethane resin comprising short chain diol units having a cyclic structure and long chain units containing an ehter group.

17. The magnetic recording medium as claimed in claim 16, wherein said vinyl chloride based on resin has an average molecular weight by gel permeation chromatography of from about 5,000 to about 15,000.

18. The magnetic recording medium as claimed in claim 16, wherein said nonmagnetic layer contains said polyurethane resin in an amount of from 20 to 80% by weight based on the total weight of said binder resin.

19. The magnetic recording medium as claimed in claim 16, wherein said binder resin is cured with a polyisocyanate compound.

20. The magnetic recording medium as claimed in claim 14, wherein said nonmagnetic layer further comprises an aromatic organic acid compound in an amount of from 0.1 to 0.5 mol per kg of said nonmagnetic powder.

21. The magnetic recording medium as claimed in claim 14, wherein said binder resin contained in said nonmagnetic layer is contained in an amount of from 14 to 20 parts by weight per 100 parts by weight of the total amount of said nonmagnetic inorganic powder.

22. The magnetic recording medium as claimed in claim 14, wherein residual magnetic flux density (Br) of said magnetic layer is from 5,000 to 8,000 G.

23. The magnetic recording medium as claimed in claim 14, wherein said ferromagnetic metal powder has Hc of from 2,250 to 2,800 Oe, a saturation magnetization ($\sigma_s$) of from 150 to 170 emu/g, a crystallite size of from 120 to 160 Å, and SFD of 0.95 or less.

24. The magnetic recording medium as claimed in claim 14, wherein said binder resin contained in said magnetic layer comprises a polyurethane resin in an amount of from 70 to 100% by weight based on the total weight of said binder resin.

25. The magnetic recording medium as claimed in claim 14, wherein a root mean surface roughness of said magnetic layer measured using an atomic force microscope ranges from 2 to 15 nm.

26. The magnetic recording medium as claimed in claim 14, wherein said nonmagnetic inorganic powder is at least one compound selected from the group consisting of α-alumina having an alpha-conversion of 90% or more, β-alumina, γ-alumina, θ-alumina, silicon carbide, chromium oxide, cerium oxide, α-iron oxide, goethite, corundum, silicon nitride, titanium carbide, titanium oxide, silicon dioxide, stannic oxide, magnesium oxide, tungsten oxide, zirconium oxide, boron nitride, zinc oxide, calcium carbonate, calcium sulfate, barium sulfate, and molybdenum disulfide.

27. The magnetic recording medium as claimed in claim 14, wherein said nonmagnetic powder is an acicular α-iron oxide having an average long axis length of 0.3 μm or less.

28. The magnetic recording medium as claimed in claim 27, wherein said nonmagnetic inorganic powder has a pH value of between 7 and 10.

29. The magnetic recording medium as claimed in claim 27, wherein at least a part of said nonmagnetic inorganic powder is covered with at least one compound selected from the group consisting of $Al_2O_3$, $SiO_2$ and $ZrO_2$.

30. The magnetic recording medium as claimed in claim 14, wherein said nonmagnetic layer further comprises carbon blacks.

31. The magnetic recording medium as claimed in claim 14, wherein said magnetic layer further comprises carbon blacks in an amount of from 0.1 to 3% by weight based on the weight of said ferromagnetic metal powder.

32. The magnetic recording medium as claimed in claim 31, wherein said magnetic layer further comprises at least one abrasive powder selected from the group consisting of α-alumina having an alpha-conversion rate of 90% or more, β-alumina, silicon carbide, chromium oxide, cerium oxide, α-iron oxide, corundum, artificial diamond, silicon nitride, silicon carbide, titanium carbide, titanium oxide, silicon dioxide, and boron nitride.

33. The magnetic recording medium as claimed in claim 14, wherein the total weight of said binder resin based on the weight of said ferromagnetic metal powder contained in said magnetic layer is from 5 to 12% by weight.

34. The magnetic recording medium as claimed in claim 33, wherein said binder resin contained in said magnetic layer comprises a polyurethane resin in an amount of from 70 to 100% by weight based on the total weight of said binder resin.

35. The magnetic recording medium as claimed in claim 14, wherein a center line average surface roughness of a side of said support on which said magnetic layer is coated ranges from 0.2 to 6 nm.

* * * * *

UNITED STATES PATENT AND TRADEMARK OFFICE
CERTIFICATE OF CORRECTION

PATENT NO. : 6,203,934 B1
DATED : March 20, 2001
INVENTOR(S) : Naoe et al.

It is certified that error appears in the above-identified patent and that said Letters Patent is hereby corrected as shown below:

<u>Claim 1</u>,
Line 6, change "03.0" to -- 0.30 --.

Signed and Sealed this

Twentieth Day of November, 2001

Attest:

*Nicholas P. Godici*

NICHOLAS P. GODICI
*Attesting Officer*  *Acting Director of the United States Patent and Trademark Office*